US009832235B2

United States Patent
Jacobsohn et al.

(10) Patent No.: US 9,832,235 B2
(45) Date of Patent: Nov. 28, 2017

(54) METHOD AND APPARATUS FOR EXTENDING THE USE OF AN IMS ORIENTED HANDLING OF TELECOMMUNICATIONS SERVICES

(71) Applicant: Deutsche Telekom AG, Bonn (DE)

(72) Inventors: Dieter Jacobsohn, Bonn (DE); Karl-Heinz Nenner, Bornheim (DE); Steffen Habermann, Fiersbach (DE); Georg Wegmann, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/102,874

(22) PCT Filed: Dec. 12, 2014

(86) PCT No.: PCT/EP2014/077605
§ 371 (c)(1),
(2) Date: Jun. 9, 2016

(87) PCT Pub. No.: WO2015/086831
PCT Pub. Date: Jun. 18, 2015

(65) Prior Publication Data
US 2016/0315978 A1    Oct. 27, 2016

(30) Foreign Application Priority Data

Dec. 13, 2013 (EP) ..................................... 13197284

(51) Int. Cl.
*H04W 8/18* (2009.01)
*H04L 29/06* (2006.01)
(Continued)

(52) U.S. Cl.
CPC ...... *H04L 65/1073* (2013.01); *H04L 65/1016* (2013.01); *H04L 67/306* (2013.01); *H04W 8/183* (2013.01); *H04L 61/3095* (2013.01)

(58) Field of Classification Search
CPC ........... H04W 4/12; H04W 4/02; H04W 4/14; H04W 4/08; H04W 12/00; H04W 12/02;
(Continued)

(56) References Cited

U.S. PATENT DOCUMENTS

2008/0032695 A1    2/2008   Zhu et al.
2008/0247385 A1* 10/2008   Witzel ................ H04L 65/1036
                                                                  370/352

(Continued)

FOREIGN PATENT DOCUMENTS

WO   WO 2007045264 A1    4/2007
WO   WO 2009083034 A1 * 7/2009 ............ H04L 29/06

OTHER PUBLICATIONS

"Ericsson Review No. 2", Jan. 1, 2008 (Jan. 1, 2008), XP055116136, Retrieved from the Internet: URL: http://www.ericsson.com/ericsson/corpinfo/publications/review/2008_02/files/7_IMA.pdf [retrieved on May 2, 2014], p. 83, col. 2-col. 3; figure 3.

*Primary Examiner* — Meless Zewdu
(74) *Attorney, Agent, or Firm* — Leydig, Voit & Mayer, Ltd.

(57) ABSTRACT

A method for extending IP Multimedia Subsystem (IMS)-oriented handling of telecommunications services within a telecommunications network for a subscriber using circuit switched (CS) connectivity, wherein an identification information of the subscriber is natively lacking an IMS identity and/or IMS profile within the telecommunications network, includes: generating, at least temporarily, by an identity management functionality of the telecommunications net-
(Continued)

work, an IMS identity and/or IMS profile with respect to the subscriber.

15 Claims, 11 Drawing Sheets

(51) Int. Cl.
*H04L 29/08* (2006.01)
*H04L 29/12* (2006.01)

(58) Field of Classification Search
CPC ... H04W 12/10; H04W 76/02; H04W 76/021; H04W 4/003; H04W 4/18; H04W 92/08; H04W 88/02; H04W 88/023; H04W 88/184; H04N 1/00312
See application file for complete search history.

(56) References Cited

U.S. PATENT DOCUMENTS

| | | | | |
|---|---|---|---|---|
| 2010/0085937 | A1* | 4/2010 | Pressley | H04W 8/06 370/331 |
| 2011/0286429 | A1* | 11/2011 | Vikberg | H04W 36/0005 370/331 |
| 2014/0133399 | A1* | 5/2014 | Kim | H04W 4/14 370/328 |

* cited by examiner

METHOD AND APPARATUS FOR EXTENDING THE USE OF AN IMS ORIENTED HANDLING OF TELECOMMUNICATIONS SERVICES

CROSS-REFERENCE TO RELATED APPLICATIONS

This application is a U.S. National Phase application under 35 U.S.C. §371 of International Application No. PCT/EP2014/077605, filed on Dec. 12, 2014, and claims benefit to European Patent Application No. EP 13197284.6, filed on Dec. 13, 2013. The International Application was published in English on Jun. 18, 2015 as WO 2015/086831 A1 under PCT Article 21(2).

FIELD

The present invention relates inter alia to a method for extending the use of an IMS (IP Multimedia Subsystem)-oriented handling of telecommunications services within a telecommunications network by providing services of the telecommunications network to a subscriber.

Furthermore, the present invention relates to a telecommunications network for extending the use of an IMS-oriented handling of telecommunications services within the telecommunications network by providing services of the telecommunications network to a subscriber.

Additionally, the present invention relates to a CS gateway node for extending the use of an IMS-oriented handling of telecommunications services within the telecommunications network by providing services of the telecommunications network to a subscriber.

Furthermore, the present invention relates to a program comprising a computer readable program code, and to a computer program product for using a telecommunications network.

BACKGROUND

In telecommunications networks, especially public land mobile networks or telecommunications networks for mobile communication, there is a need to provide services of the telecommunications network according to different kinds of accesses or attachments of user equipments to the telecommunications network (or different radio access technologies, RAT), such as, e.g. 2G access, 3G access or 4G access.

The term 2G access relates to second generation mobile telecommunications networks and corresponding user equipments, typically denoted by the GSM standard (Global System for Mobile communication). The term 3G access relates to third generation mobile telecommunications network and corresponding user equipments, typically denoted by the UMTS standard (Universal Mobile Telecommunication System). The term 4G access relates to fourth generation mobile telecommunications network and corresponding user equipments, typically denoted by the LTE standard (Long Term Evolution).

According to older radio access technologies (i.e. older kinds of access or attachment of user equipments to the telecommunications network), especially 2G and 3G standards, the network is required to provide the possibility (to user equipments) of a CS access (circuit switched access) or CS attachment (circuit switched attachment) to the telecommunications network, whereas according to more recent radio access technologies, especially the 4G standard, the network is required to provide a PS access (packet switched access) or PS attachment (packet switched attachment).

The specific costs (i.e. costs related to serving a certain number of subscribers or transmitting a certain volume of data) associated with maintaining and operating legacy components of telecommunications networks, especially components providing CS (circuit switched) attachment of user equipments is typically growing relative to the specific costs associated with components providing PS (packet switched) attachments of user equipments. As a consequence, the relative share of PS capabilities of typical telecommunications networks, especially according to or implementing the IP Multimedia Subsystem (IMS), typically grows.

The IP Multimedia Subsystem (IMS) is a framework for delivering multimedia services based on IP (Internet Protocol) connections to mobile user equipments. Typically, IMS uses IETF (Internet Engineering Task Force) protocols, e.g., SIP (Session Initiation Protocol).

Despite the rise of PS capabilities of typical telecommunications networks (relative to CS capabilities), CS connectivity needs to be assured by the telecommunications network to maintain services for those user equipments or subscribers that are not able to use the PS capabilities. It is desirable to apply an IMS-oriented handling of telecommunications services also in the case of CS connectivity. In case of such an IMS-oriented handling of telecommunications services, an IMS identity and/or one IMS profile (or a plurality of IMS profiles) is required for each subscriber. Typically both an IMS identity and one or a plurality of IMS profiles (associated to a user equipment or associated to a subscriber) are required for IMS handling. An example of the IMS identity is "IP Multimedia Private Identity" (IMPI), which is a unique permanently allocated global identity assigned by the home network operator, and is typically used for Registration, Authorization, Administration, and Accounting purposes. Normally, every IMS user shall have one IMPI.

However, in a roaming scenario, it cannot be assumed or guaranteed for all roaming partners of a given telecommunications network that such an IMS identity and/or an IMS profile (or a plurality of IMS profiles) exist for a given user equipment or subscriber roaming in the telecommunications network.

SUMMARY

In an embodiment, the invention provides a method for extending IP Multimedia Subsystem (IMS)-oriented handling of telecommunications services within a telecommunications network for a subscriber using circuit switched (CS) connectivity. An identification information of the subscriber is natively lacking an IMS identity and/or IMS profile within the telecommunications network. The method includes: generating, at least temporarily, by an identity management functionality of the telecommunications network, an IMS identity and/or IMS profile with respect to the subscriber.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
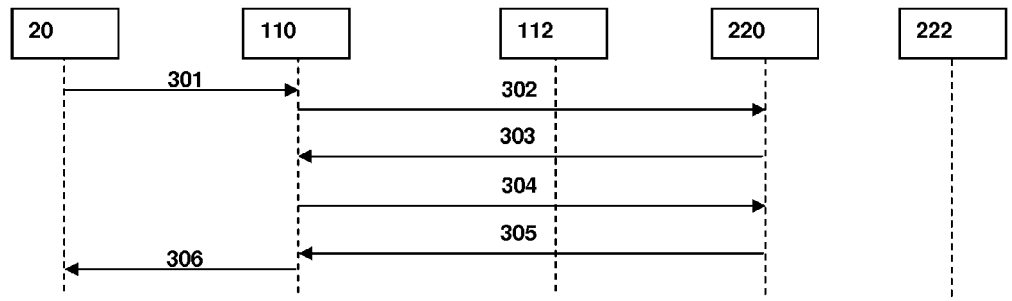
FIG. 1 schematically illustrates an example of a communication diagram between a user equipment or subscriber and a number of network nodes of a telecommunications network, showing a basic location update procedure, or an attachment procedure of the user equipment or subscriber that will—after completion of the procedure—be CS-attached to the telecommunications network.

In an embodiment, the invention provides a method for extending the use of an IMS (IP Multimedia Subsystem)-oriented handling of telecommunications services within a telecommunications network by providing services of the telecommunications network to a subscriber natively lacking an IMS identity and/or an IMS profile within the telecommunications network such that both fixed costs as well as operational costs can be reduced, and nevertheless the service level of the mobile telecommunications network preserved or even extended.

In an embodiment, the invention provides a method for extending the use of an IMS (IP Multimedia Subsystem)-oriented handling of telecommunications services within a telecommunications network by providing these services of the telecommunications network to a subscriber that uses CS connectivity, wherein an identification information of the subscriber is natively lacking an IMS identity and/or IMS profile within the telecommunications network, wherein the telecommunications network comprises an identity management functionality such that an IMS identity and/or IMS profile is, at least temporarily, generated by the telecommunications network with respect to the subscriber.

According to the present invention it is thereby advantageously possible, that an IMS-oriented handling of telecommunications services can be provided for in the telecommunications network, and nevertheless network resources be used more efficiently in the telecommunications network.

The telecommunications network comprises a functionality denoted by the term "identity management functionality" that generates the IMS identity and/or the IMS profile (or the plurality of IMS profiles). The identity management functionality is advantageously realized within the telecommunications network via a network node and/or via a functional module associated or integrated within a network node of the telecommunications network. Alternatively, the identity management functionality can also be realized in a distributed manner, i.e. distributed among a plurality of network nodes of the telecommunications network. This means that the identity management functionality is primarily defined in terms of functionality, this function or functionality may be collocated in the implementation with existing functions. In the context of the present invention, the identity management functionality is also denoted by the term "temporary identity management" or "temporary identity management functionality" in order to stress especially in case of an inbound roaming situation of the considered subscriber that the IMS identity and/or an IMS profile (or a plurality of IMS profiles) for such a subscriber is typically not permanent within the telecommunications network.

By using the identity management functionality for CS-attached subscribers that lack a native IMS identity, it is advantageously possible that in the IMS-oriented handling of telecommunications services within the telecommunications network, the standard flow of service invocation (e.g. for voice services, data services, supplementary services, short messaging services and CAMEL (Customised Applications for Mobile networks Enhanced Logic) (via IM-SSF (IP Multimedia Service Switching Function)) can be applied. In order to extend the IMS-oriented handling of such telecommunications services also to subscribers that natively lack an IMS identity (i.e. CS-attached subscribers), only an additional subscriber data management flow needs to be added.

According to the present invention, a first important application scenario or embodiment of the inventive method as well as of the inventive telecommunications network comprising an identity management functionality, corresponds to a roaming situation where a CS-attached subscriber—having a home telecommunications network different to the considered telecommunications network—is (inbound) roaming in the considered (visited) telecommunications network, i.e. besides the considered telecommunications network there exists a further (or another) telecommunications network being the home telecommunications network of the considered CS-attached subscriber.

According to the present invention, it is preferred that in case that the subscriber is a roaming subscriber within the telecommunications network such that the telecommunications network, with respect to the subscriber, is the visited telecommunications network and the subscriber is additionally associated with a further telecommunications network serving as home telecommunications network, in order for the subscriber to register with the visited telecommunications network, the method comprises the following steps:

in a first step, the home telecommunications network is contacted by the visited telecommunications network in order for the visited telecommunications network to obtain the IMS identity and/or IMS profile of the subscriber, in a second step—subsequent to the first step and after recognizing the absence of an IMS identity and/or IMS profile of the subscriber from the home telecommunications network of the subscriber—an IMS identity and/or IMS profile is created by the visited telecommunications network and used with respect to the subscriber within the visited telecommunications network.

Thereby it is advantageously possible, that for a roaming subscriber in the telecommunications network (i.e. an inbound roaming subscriber for which the telecommunications network is the visited telecommunications network and a further telecommunications network is the home telecommunications network), an IMS identity and/or an IMS profile (or a plurality of IMS profiles) is generated and used for the purposes of the telecommunications network (i.e. the visited telecommunications network).

According to the present invention, via the identity management functionality (or "temporary identity management" or "temporary identity management functionality")—in the visited telecommunications network of the subscriber—the limitations of the IMS service centralization in 3GPP are overcome. According to these limitations, at least according to specifications such as ICS (IMS Centralized Services), it is required that also the home telecommunications network creates an IMS identity (and an IMS profile) for its own subscribers; however this cannot be assumed or guaranteed for all possible roaming partners of the telecommunications network that such an IMS identity and/or an IMS profile (or a plurality of IMS profiles) exist for a given user equipment or subscriber roaming in the telecommunications network. The identity management functionality acts towards the IMS as a subscriber provisioning service and towards the home telecommunications network (of the subscriber, i.e. towards the further telecommunications network) as a VLR (Visited location register).

In the considered situation of a roaming subscriber (i.e. inbound roaming subscriber) in the telecommunications network, it is preferred that the IMS identity and/or the IMS profile (or the plurality of IMS profiles) only exists during the time interval of inbound roaming of this subscriber, and that the IMS identity and/or the IMS profile (or the plurality of IMS profiles) is deleted after completion of the inbound roaming activity of that subscriber. This deletion does not necessarily need to occur directly after (i.e. very shortly after) the considered subscriber leaving the (visited) telecommunications network; according to one alternative embodiment of the present invention, the IMS identity and/or the IMS profile (or the plurality of IMS profiles) for that subscriber are maintained (in the telecommunications network) for a certain time interval, e.g. a predetermined time interval.

After the IMS identity and/or the IMS profile (or the plurality of IMS profiles) is generated, providing telecommunications services—for the considered roaming subscriber—using the IMS identity and/or the IMS profile (or the plurality of IMS profiles) is possible in a similar manner as for the other subscribers (i.e. those subscribers that can "natively" use the IMS capabilities of the telecommunications network) of the telecommunications network, applying an IMS-oriented handling within the telecommunications network.

Furthermore, it is preferred according to the present invention that the IMS identity and/or IMS profile of the subscriber is generated using a home identity information of the subscriber in the home telecommunications network, the home identity information preferably being the IMSI (International Mobile Subscriber Identification) wherein preferably a set of subscriber related data is sent from the home telecommunications network to the visited telecommunications network such that the IMS identity and/or IMS profile of the subscriber is generated using the set of subscriber related data, especially identification, permission, registration and/or activation data.

Thereby, it is advantageously possible according to the present invention that the generated IMS identity and/or the IMS profile (or the plurality of IMS profiles) is specific to the subscriber in the telecommunications network. Especially, it is preferred according to the present invention that the home identity information is the IMSI (International Mobile Subscriber Identification) of the subscriber. At least the IMSI information is typically transmitted from the further telecommunications network (i.e. home telecommunications network of the considered roaming subscriber) to the telecommunications network (i.e. the visited telecommunications network) upon any CS attachment procedure of the inbound roaming subscriber. Additionally to transmitting (and using for generating the IMS identity and/or the IMS profile (or the plurality of IMS profiles)) the home identity information of the subscriber (of the home telecommunications network), it is preferred that a set of subscriber related data is sent from the home telecommunications network to the visited telecommunications network. Thereby, the IMS identity and/or IMS profile of the subscriber can be generated using the set of subscriber related data, especially identification, permission, registration and/or activation data.

According to the present invention, it is preferred that the IMS identity and/or the IMS profile (or the plurality of IMS profiles) is generated in dependency of the identity of the further telecommunications network (i.e. the home telecommunications network of the considered subscriber), i.e. if the home telecommunications network of the subscriber corresponds to network A, the generation of the IMS identity and/or the IMS profile (or the plurality of IMS profiles) of the inbound roaming subscriber might be different from the generation of the IMS identity and/or the IMS profile (or the plurality of IMS profiles) in case that the home telecommunications network of the subscriber corresponds to network B.

Furthermore, it is preferred that the IMS identity and/or the IMS profile (or the plurality of IMS profiles) is generated in dependency of an attribute of the subscriber such as the subscriber class or other attribute.

Still furthermore, it is preferred according to the present invention—especially according to the first embodiment or application scenario—that prior to creating the IMS identity and/or IMS profile by the visited telecommunications network, a location update procedure is performed in the home telecommunications network (related to the inbound roaming subscriber).

Thereby, it is advantageously possible according to the present invention, that the set of subscriber related data can be easily determined and transmitted to the telecommunications network, i.e. the visited telecommunications network.

According to the present invention, a second important application scenario or embodiment of the inventive method as well as of the inventive telecommunications network comprising an identity management functionality, corresponds to a non-roaming situation where the home telecommunications network of the considered subscriber using CS connectivity corresponds to the telecommunications network.

Furthermore, it is preferred according to the present invention that in case that the telecommunications network is the home telecommunications network of the subscriber, in order for the subscriber to register with the telecommunications network, the IMS identity and/or IMS profile is created by the telecommunications network and used with respect to the subscriber within the telecommunications network.

According to this second embodiment of the present invention as well as according to the first embodiment of the present invention, it is advantageously possible that the IMS profile (or the plurality of IMS profiles) is only created if need be, i.e. in case that the considered subscriber (lacking a native IMS identity in the telecommunications network and using CS connectivity) requests the execution of a service that is provided within the telecommunications network using an IMS-oriented handling.

Furthermore, it is preferred—especially according to the first and to the second embodiment or application scenario—that the IMS identity and/or the IMS profile (or the plurality of IMS profiles) is generated in dependency of an attribute of the subscriber such as the subscriber class or other attribute.

Furthermore, it is preferred according to the present invention—according to the first or second embodiment or application scenario—that the IMS identity and/or IMS profile of the subscriber is generated using an identity information of the CS-attached subscriber in the telecommunications network,
the identity information preferably being the IMSI (International Mobile Subscriber Identification)
wherein preferably a set of subscriber related data is used for generating the IMS identity and/or IMS profile of the subscriber, especially identification, permission, registration and/or activation data.

Thereby, it is advantageously possible according to the present invention that the generated IMS identity and/or the IMS profile (or the plurality of IMS profiles) is specific to the subscriber in the telecommunications network. Especially, it is preferred according to the present invention that the identity information is the IMSI (International Mobile Subscriber Identification) of the subscriber. At least the IMSI information is available upon any CS attachment procedure of the subscriber. Additionally to using the home identity information for generating the IMS identity and/or the IMS profile (or the plurality of IMS profiles) of the subscriber, it is preferred that a set of subscriber related data is used for generating the IMS identity and/or IMS profile of the subscriber.

The present invention also relates to a telecommunications network for extending the use of an IMS (IP Multimedia Subsystem)-oriented handling of telecommunications services within a telecommunications network by providing services of the telecommunications network to a subscriber that uses CS connectivity in the telecommunications network, wherein an identification information of the subscriber is natively lacking an IMS identity and/or IMS profile within the telecommunications network, wherein the telecommunications network comprises an identity management functionality such that an IMS identity and/or IMS profile is, at least temporarily, generated by the telecommunications network with respect to the subscriber.

According to the present invention, it is preferred—especially with respect to the telecommunications network and/or the method according to the present invention—that the telecommunications network comprises an interconnection gateway node for communication with a further telecommunications network, wherein a further subscriber is attached to the further telecommunications network, wherein the interconnection gateway node is configured to extend the use of an IMS (IP Multimedia Subsystem)-oriented handling of telecommunications services of the telecommunications network to the further subscriber in case that the telecommunications network, with respect to the further subscriber, is a home telecommunications network, wherein the further telecommunications network is preferably, with respect to the further subscriber, a visited telecommunications network, wherein the further telecommunications network preferably only provides CS connectivity to the further subscriber, wherein the interconnection gateway node is preferably configured for:

handling, on behalf of the further subscriber, IMS registration with the IMS of the telecommunications network, in case the interconnection gateway node receives, from the further telecommunications network, location update request information related to the further subscriber, and/or handling, on behalf of the further subscriber, IMS de-registration with the IMS of the telecommunications network, in case the interconnection gateway node receives, from the further telecommunications network, a detach request related to the further subscriber, and/or routing a mobile terminated call, designated for the further subscriber, from the IMS of the telecommunications network to the further telecommunications network, and/or routing a mobile originated call, initiated by the further subscriber, from the further telecommunications network to the IMS of the telecommunications network, and/or forwarding, to the further telecommunications network, subscriber update data related to the further subscriber, in case the interconnection gateway node receives, from the further telecommunications network, a Subscriber Controlled Input (SCI) Request related to the further subscriber, and/or forwarding, to the further telecommunications network, a Short Message (SM), designated for the further subscriber, in case the interconnection gateway node receives, from the IMS of the telecommunications network, a message comprising the SM, and/or notifying the further telecommunications network about a status change related to the further subscriber, in case the interconnection gateway node receives, from the further telecommunications network, Report SM Status Request information related to the user, and/or handling, on behalf of the further subscriber, another IMS registration with the IMS of the telecommunications network, in case the interconnection gateway node receives, from the further telecommunications network, Ready For SM Request information related to the further subscriber, and/or forwarding, to the IMS of the telecommunications network, a further message comprising a further SM, designated to the further subscriber, in case the interconnection gateway node receives, from the further telecommunications network, the further SM, and/or transmitting, to a Short Message Service Centre (SMSC) of another telecommunications network, routing data in case the interconnection gateway node receives, from the SMSC, a Send Routing Information (SRI) for SM Request related to the further subscriber, wherein the routing data comprises identification information for identification of the interconnection gateway node, wherein the interconnection gateway node is configured for transmitting, to the IMS of the telecommunications network, another message comprising another SM in case the interconnection gateway node receives, from the SMSC, a SM related to the further subscriber.

Thereby it is advantageously possible, that for a (roaming) further subscriber in the further telecommunications network (i.e. an outbound roaming subscriber for which the telecommunications network is the home telecommunications network and the further telecommunications network is the visited telecommunications network), an IMS identity and/or an IMS profile (or a plurality of IMS profiles) is generated and used for extending the use of the telecommunications services of the IMS of the telecommunications network to the further telecommunications network (i.e. the visited telecommunications network). According to the present invention, the interconnection gateway node is preferably also called interconnection gateway, more preferably roaming gateway node or roaming gateway in case of an outbound roaming further subscriber.

According to the present invention, it is preferred—with respect to the telecommunications network and especially according to the first embodiment or application scenario—that
in case that the subscriber is a roaming subscriber within the telecommunications network such that the telecommunications network, with respect to the subscriber, is the visited telecommunications network and the subscriber is additionally associated with a further telecommunications network serving as home telecommunications network, in order for the subscriber to register with the visited telecommunications network, the telecommunications network is configured such that:
- the home telecommunications network is contacted by the visited telecommunications network in order for the visited telecommunications network to obtain the IMS identity and/or IMS profile of the subscriber,
- after recognizing the absence of an IMS identity and/or IMS profile of the subscriber from the home telecommunications network of the subscriber—an IMS identity and/or IMS profile is created by the visited telecommunications network and used with respect to the subscriber within the visited telecommunications network.

Furthermore, it is preferred—with respect to the telecommunications network and especially according to the first embodiment or application scenario—that the IMS identity and/or IMS profile of the subscriber is generated using a home identity information of the subscriber in the home telecommunications network, the home identity information preferably being the IMSI (International Mobile Subscriber Identification).

Additionally according to the present invention, it is preferred—with respect to the telecommunications network and especially according to the first embodiment or application scenario—that the telecommunications network is configured such that prior to creating the IMS identity and/or IMS profile by the visited telecommunications network, a location update procedure is performed in the home telecommunications network, and a set of subscriber related data sent to the visited telecommunications network, the IMS identity and/or IMS profile of the subscriber being generated using the set of subscriber related data, especially identification, permission, registration and activation data.

According to the present invention, it is preferred—with respect to the telecommunications network and especially according to the second embodiment or application scenario—that the telecommunications network is the home telecommunications network of the subscriber, in order for the subscriber to register with the telecommunications network, the IMS identity and/or IMS profile is created by the telecommunications network and used with respect to the subscriber within the telecommunications network.

Furthermore, it is preferred—with respect to the telecommunications network and especially according to the first or second embodiment or application scenario—that the telecommunications network comprises at least one CS gateway node, the CS gateway node acting as an interface towards the subscriber, preferably providing an Iu interface and/or an A interface, wherein the CS-gateway node provides for the location management of the subscriber, lacking an SS7 interface towards other nodes of the telecommunications network, wherein the at least one CS gateway node preferably comprises the interconnection gateway node.

By using a CS gateway lacking an SS7 interface towards other nodes of the telecommunications network, it is advantageously possible to provide handling and service towards subscribers that use CS connectivity in a very efficient manner, especially avoiding the costs associated with maintaining and operating a multitude of network nodes having an SS7 interface.

Additionally, the present invention relates to a CS gateway node for use with an inventive telecommunications network, wherein the CS gateway node acts as an interface towards the subscriber, preferably providing an Iu interface and/or an A interface, wherein the CS-gateway node provides for the location management of the subscriber, lacking an SS7 interface towards other nodes of the telecommunications network.

Furthermore, the present invention relates to a program comprising a computer readable program code which, when executed on a computer or on a network node of a telecommunications network or on a network node of a further telecommunications network or partially on a network node of the telecommunications network and partially on a network node of the further telecommunications network, causes the computer or the network node of the telecommunications network or the network node of the further telecommunications network to perform the inventive method.

The present invention also relates to a computer program product for using a telecommunications network, the computer program product comprising a computer program stored on a storage medium, the computer program comprising program code which, when executed on a computer or on a network node of the telecommunications network or on a network node of a further telecommunications network or partially on a network node of the telecommunications network and partially on a network node of the further telecommunications network, causes the computer or the network node of the telecommunications network or the network node of the further telecommunications network to perform the inventive method.

It is, however to be understood that the implementation of the inventive method does not necessarily need to rely on physical machines such as hardware components or the like. The "network node of the telecommunications network" or the "network node of a further telecommunications network" can also be realized via virtual machines.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, an example of a communication diagram between a user equipment 20 or subscriber 20 and a number of network nodes of a telecommunications network 100 is schematically shown. The communication diagram of FIG. 1 shows a basic location update procedure, or an attachment procedure of the user equipment 20 or subscriber 20 that will—after completion of the procedure—be CS-attached to the telecommunications network 100. The example illustrated in FIG. 1 relates to a roaming situation where the CS-attached subscriber 20—having a home telecommunications network 200 different to the considered telecommunications network 100—is (inbound) roaming in the considered (visited) telecommunications network 100.

The communication diagram of FIG. 1 shows the communication between the user equipment 20 or subscriber 20, a V-MSC server (Visited MSC (Mobile Switching Center) server) 110, a G-MSC server (Gateway MSC server) 112, a HLR (Home Location Register) 220 of the further telecommunications network 200, and a H-GMSC server (Home Gateway MSC server) 222 of the further telecommunications network 200.

In a first processing step 301, the user equipment 20 sends a Location Updating Request message to the V-MSC server 110. In a second processing step 302, the V-MSC server 110 sends a MAP (Mobile Application Part) Update Location Request message to the HLR 220 of the further telecommunications network 200. In a third processing step 303, the HLR 220 sends a MAP Insert Subscriber Data Request message to the V-MSC server 110. In a fourth processing step 304, the V-MSC server 110 sends a MAP Insert Subscriber Data Acknowledgement message to the HLR 220 of the further telecommunications network 200. In a fifth processing step 305, the HLR 220 sends a MAP Update Location Acknowledgment message to the V-MSC server 110. In a sixth processing step 306, the V-MSC server 110 sends a Location Updating Accept message to the user equipment 20/subscriber 20.

Figure 2:
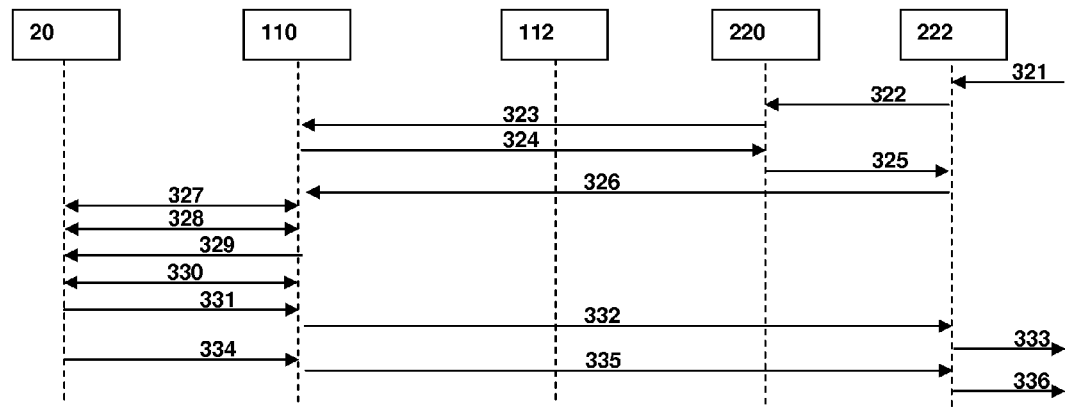
FIGS. 2 and 3 schematically illustrate a communication diagram between a user equipment or subscriber and a number of network nodes of a telecommunications network, showing a basic mobile terminated call (FIG. 2), and a basic mobile originated call (FIG. 3), respectively.

In FIG. 2, an example of a communication diagram between a user equipment 20 or subscriber 20 and a number of network nodes of a telecommunications network 100 is schematically shown. The communication diagram of FIG. 2 shows a basic mobile terminated call of the user equipment 20 or subscriber 20. The example illustrated in FIG. 2 relates to a roaming situation where the CS-attached subscriber 20—having the home telecommunications network 200 different to the considered telecommunications network 100—is (inbound) roaming in the considered (visited) telecommunications network 100.

The communication diagram of FIG. 2 shows the communication between the user equipment 20 or subscriber 20, a V-MSC server (Visited MSC (Mobile Switching Center) server) 110, a G-MSC server (Gateway MSC server) 112, a HLR (Home Location Register) 220 of the further telecommunications network 200, and a H-GMSC server (Home Gateway MSC server) 222 of the further telecommunications network 200.

In a first processing step 321, the H-GMSC server 222 receives an Initial Access Message (IAM message) related to the mobile terminated call. In a second processing step 322, the H-GMSC server 222 sends a Send Routing Information (SRI) message to the HLR 220. In a third processing step 323, the HLR 220 sends a Provide Roaming Number (PRN) message to the V-MSC server 110. In a fourth processing step 324, the V-MSC server 110 sends a Provide Roaming Number (PRN) Message to the HLR 220. In a fifth processing step 325, the HLR 220 sends a Send Routing Information Acknowledgement (SRI Ack) message to the H-GMSC server 222. In a sixth processing step 326, the H-GMSC server 222 sends an Initial Access Message (IAM message) to the V-MSC server 110. In a seventh processing step 327, paging occurs between the V-MSC server 110 and the user equipment 20 or subscriber 20. In an eighth processing step 328, a security procedure occurs between the user equipment 20 or subscriber 20 and the V-MSC server 110. In a ninth processing step 329, the V-MSC server 110 sends a Setup message to the user equipment 20 or subscriber 20. In a tenth processing step 330, channel allocation occurs between the user equipment 20 or subscriber 20 and the V-MSC server 110. In a eleventh processing step 331, the user equipment 20 or subscriber 20 sends an alerting message to the V-MSC server 110. In a twelfth processing step 332, the V-MSC server 110 sends an ACM message (Address Complete Message) to the H-GMSC server 222. In a thirteenth processing step 333, the H-GMSC server 222 sends an ACM message to other network nodes in order process the mobile terminated call. In a fourteenth processing step 334, the user equipment 20 or subscriber 20 sends a ANM message (Answer Message) to the V-MSC server 110. In a fifteenth processing step 335, the V-MSC server 110 sends a ANM message to the H-GMSC server 222. In a sixteenth processing step 336, the H-GMSC server 222 sends a ANM message to other network nodes in order process the mobile terminated call.

Figure 3:
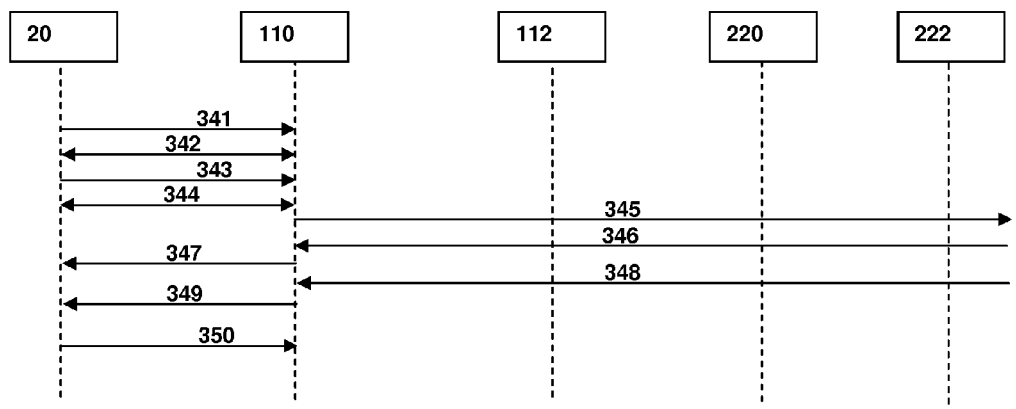

In FIG. 3, an example of a communication diagram between a user equipment 20 or subscriber 20 and a number of network nodes of a telecommunications network 100 is schematically shown. The communication diagram of FIG. 3 shows a basic mobile originated call of the user equipment 20 or subscriber 20. The example illustrated in FIG. 3 relates to a roaming situation where the CS-attached subscriber 20—having the home telecommunications network 200 different to the considered telecommunications network 100—is (inbound) roaming in the considered (visited) telecommunications network 100.

The communication diagram of FIG. 3 shows the communication between the user equipment 20 or subscriber 20, a V-MSC server (Visited MSC (Mobile Switching Center)

server) 110, a G-MSC server (Gateway MSC server) 112, a HLR (Home Location Register) 220 of the further telecommunications network 200, and a H-GMSC server (Home Gateway MSC server) 222 of the further telecommunications network 200.

In a first processing step 341, the user equipment 20 or subscriber 20 sends a CM service request message to the V-MSC server 110. In a second processing step 342, a security procedure occurs between the user equipment 20 or subscriber 20 and the V-MSC server 110. In a third processing step 343, the user equipment 20 or subscriber 20 sends a setup message to the V-MSC server 110. In a fourth processing step 344, channel allocation occurs between the user equipment 20 or subscriber 20 and the V-MSC server 110. In a fifth processing step 345, the V-MSC server 110 sends an Initial Access Message (IAM message) related to the mobile originated call. In a sixth processing step 346, the V-MSC server 110 receives an ACM message related to the mobile originated call. In a seventh processing step 347, the V-MSC server 110 sends an alert message to the user equipment 20 or subscriber 20. In an eighth processing step 348, the V-MSC server 110 receives an ANM message related to the mobile originated call. In a ninth processing step 349, the V-MSC server 110 sends a connect message to the user equipment 20 or subscriber 20. In a tenth processing step 350, the user equipment 20 or subscriber 20 sends a connect acknowledgement message to the V-MSC server 110.

Figure 4:
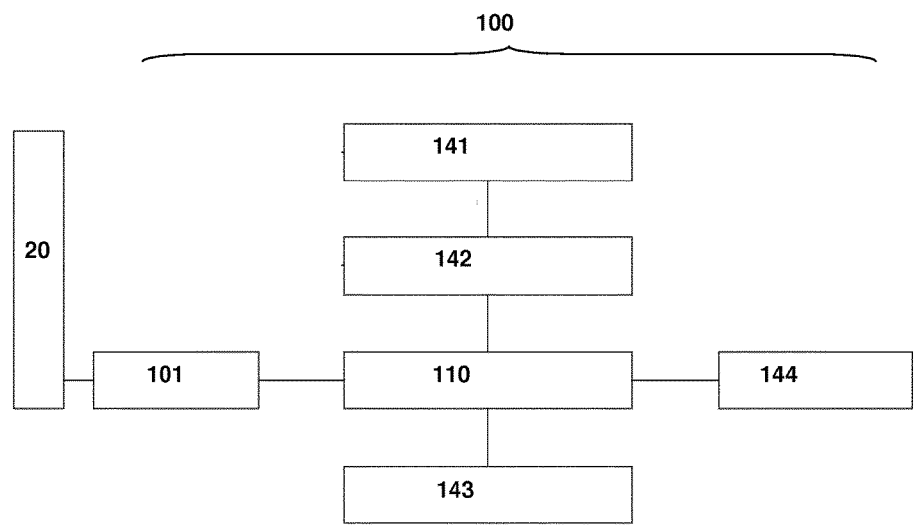
FIG. 4 schematically illustrates a part of the telecommunications network according to the present invention with a CS-attached subscriber or user equipment.

In FIG. 4, a part of the telecommunications network 100 according to the present invention is schematically shown with a CS-attached subscriber 20 or user equipment 20. The user equipment 20 or subscriber 20 is connected to the telecommunications network 100 via a CS access node 101. The CS access node 101 is connected to the MSC server 110. In case that the user equipment 20 or subscriber 20 is an inbound roaming user equipment 20 or subscriber 20 within the telecommunications network 100, the MSC server 110 corresponds to the V-MSC server 110 with respect to this subscriber 20. The MSC server 110 (or V-MSC server 110) is connected (at least logically)—in an IMS-oriented telecommunications network 100—to a TAS (Telephony Application Server) 143. The TAS (Telephony Application Server) 143 provides the service call control. Furthermore, the MSC server 110 (or V-MSC server 110) is connected (at least logically) to a CSCF (Call Session Control Function) 142. Additionally, the MSC server 110 (or V-MSC server 110) is connected (at least logically) to a CS-MGW (CS Media Gateway) 144. The CSCF (Call Session Control Function) 142 is connected (at least logically) to a SCC AS (Session CC Application Server).

Figure 5:
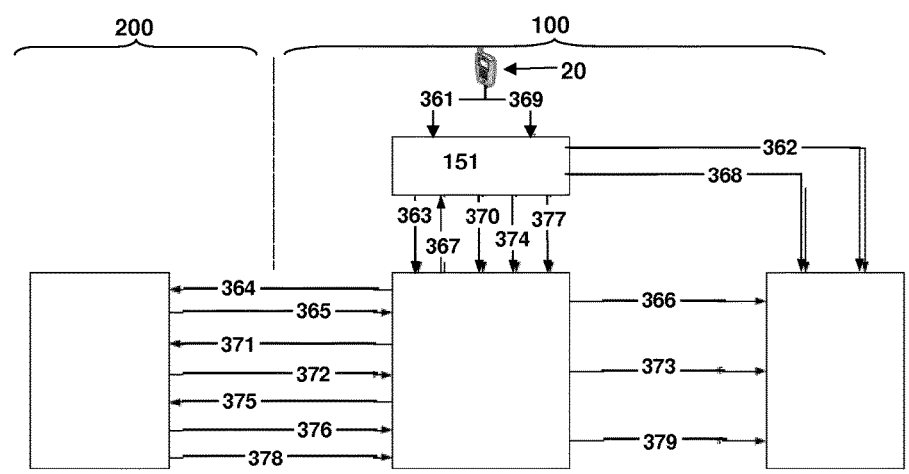
FIG. 5 schematically illustrates an example of messages exchanged within a telecommunications network and with a further telecommunications network, where an inbound roaming subscriber or user equipment, having the further telecommunications network as its home telecommunications network, is CS-attached to the telecommunications network.

In FIG. 5, an example of messages exchanged within a telecommunications network 100 and with a further telecommunications network 200 is schematically shown, where an inbound roaming subscriber 20 or user equipment 20, having the further telecommunications network 200 as its home telecommunications network, is CS-attached to the telecommunications network 100. The example illustrated in FIG. 5 relates to the first important application scenario or embodiment of the present invention, namely corresponding to a roaming situation where the CS-attached subscriber 20—having the home telecommunications network 200 different to the considered telecommunications network 100—is (inbound) roaming in the considered (visited) telecommunications network 100. FIG. 5 schematically shows the building blocks involved in the (temporary) ID management according to the present invention, using an identity management functionality 150. In this block diagram, a functional view is chosen, i.e. all functions may be distributed and duplicated in a telecommunications network (or operator network), e.g. multiple repository user functions and multiple subscriber data repositories with data synchronization or distribution, e.g. GUP (Generic User Profile). The identity management functionality 150, or temporary ID management function, typically exposes its services to various network nodes via a common API (Application Program Interface).

In a first processing step 361, the user equipment 20 or subscriber 20 (i.e. the roaming subscriber)—served in the home network (i.e. the further telecommunications network 200) by a legacy communication network—attempts to use services in a next generation visited network, i.e. the telecommunications network 100. The subscriber's devices or user equipment 20 logs on in (or attaches to) the telecommunications network 100 (i.e. visited network) providing the subscriber's home network identity information (i.e. the home identity information of the subscriber 20 in the home telecommunications network 200, especially the IMSI). The user equipment 20 or subscriber 20 is connected to a user function of the telecommunications network 100 (i.e. visited network) subscriber data repository function 151. In a second processing step 362, the Repository User function 151 attempts to authorize the subscriber's 20 (i.e. user equipment 20) attempts by retrieval of subscriber data information from the visited network subscriber repository 152 via the home network identity information (e.g. the IMSI of the user equipment 20 or subscriber 20). The attempt fails, since the subscriber 20 is not known. In a third processing step 363, the Repository User function 151 triggers the identity management functionality 150 (or Temporary ID Management function), especially via an appropriate message. The trigger or trigger message typically contains the subscriber home network identity information (i.e. the home identity information of the subscriber 20 in the home telecommunications network 200, especially the IMSI). In a fourth processing step 364, the identity management functionality 150 (or Temporary ID Management Function) invokes a Location Update procedure based on the contractual relation with the further telecommunications network 200 (i.e. the home network of the user equipment 20 or subscriber 20). The subscriber's home network identity information (i.e. the home identity information of the subscriber 20 in the home telecommunications network 200, especially the IMSI) is used. In a fifth processing step 365, the Home Subscriber Location Register 250 (of the further telecommunications network 200) invokes the legacy procedures for location updating. If the roaming subscriber 20 is entitled to roam in the visited network (i.e. the telecommunications network 100), an "Framed Insert Subscriber Data" message is sent back containing typically all identification, permission, registration and activation data for the services in the telecommunications network 100 (i.e. the visited network), e.g. Identification Data (MSISDN, IMSI), Tele Service Subscription (e.g. TS11, TS21), Bearer Service Subscription (BS26), Supplementary Services (e.g. Call Forwarding) and CAMEL subscriber data. The Home Subscriber Location Register 250 (of the further telecommunications network 200) memorizes the address of the identity management functionality 150 (i.e. the Temporary ID management) in the usual way, e.g. via VLR address to be able to manage the subscriber 20 afterwards via stand-alone ISD (Insert Subscriber Data). In a sixth processing step 366, the identity management functionality 150 (or Temporary ID Management Function) maps all the subscriber data received from the further telecommunications network 200 (or home network) to the data structure applied in the telecommunications network 100 (i.e. the visited network). An "Add Subscriber" procedure is invoked to create a temporary subscriber in the Visited Network Subscriber Repository 152. In a seventh processing step 367, the Repository User 151 is notified about the creation of the temporary subscriber. In principle the standard notification procedures between the provisioning application and the subscriber data repository apply, i.e. the identity management functionality 150 (or Temporary ID Management function) acts as a standard provisioning function in the telecommunications network 100 (visited network). In an eighth processing step 368, the Repository User Function 151 continues processing based on the visited network service execution. The subscriber 20 is authorized via the permission data received from the further telecommunications network 200 (or home network) and stored in the visited network subscriber repository 152. In a ninth processing step 369, the subscriber 20 is able to modify service data via subscriber controlled input from the mobile device 20 (or user equipment 20), e.g. register a new forward-to address or activation of call barring or the like. The Modify request is received in the visited network subscriber repository user function 151. In a tenth processing step 370, the subscriber data repository user function 151 forwards the request to the identity management functionality 150 (or Temporary ID management function). In an eleventh processing step 371, the identity management functionality 150 (or Temporary ID Management function) forwards the modification request to the home network HLR 250, e.g. via a RegisterSS or an ActivateSS operation. All supplementary service data management operations will be supported. The result of the operation is relayed from the Home Network HLR 250 to the identity management functionality 150 (or Temporary ID Management function) to the Subscriber Repository User 151 back to the subscriber's device 20. In a twelfth processing step 372, the modification of subscriber data initiated by the subscriber 20 of another home network subscriber life cycle procedures will case a change of subscriber data in the home network, e.g. change of permission data, registration of supplementary service data as defined in the ninth processing step 369. The further telecommunications network 200 (Home Network) informs the telecommunications network 100 (visited network) via the "Insert Subscriber Data" flow. In a thirteenth processing step 373, the identity management functionality 150 (or Temporary ID Management Function) maps the changed data to the local data structure and invokes the "Modify Subscriber" flow with the visited network subscriber repository 152. Notification of the Repository User Function 151 may apply as in the seventh processing step 367 depending on the (visited) telecommunications network 100. In a fourteenth processing step 374, the Repository User 151 has to notify the Home Network HLR 250 about an event, e.g. ready for Short Message reception. It sends a corresponding notification request to the identity management functionality 150, i.e. the Temporary ID Management. In a fifteenth processing step 375, the notification is sent to the further telecommunications network 200 (Home network) via an appropriate indication, e.g. ready-for-SM. In a sixteenth processing step 376, the further telecommunications network 200 (Home Network) may ask the identity management functionality 150 (Temporary ID Management) for a temporary roaming number to be able to deliver a mobile terminated call via a "Provide Roaming Number" (PRN) message. The identity management functionality 150 (Temporary ID Management) assigns a number from a temporary number pool and assigns it to the subscriber 20. It invokes the "Modify Subscriber" as depicted in the thirteenth processing step 373 to add an alias to the subscriber 20. In a seventeenth processing step 377, on reception of the corresponding mobile terminated call, the repository user 151 will request the identity management functionality 150 (Temporary ID Management) to delete the alias. The identity management functionality 150 (Temporary ID Management function) invokes a "Modify Subscriber" as depicted in the thirteenth processing step 373 to delete an alias of the subscriber 20. In an eighteenth processing step 378, the further telecommunications network 200 (Home Network) deletes the subscriber 20 in the telecommunications network 100 (visited network), a "Cancel Location" flow is invoked. In a nineteenth processing step 379, the identity management functionality 150 (Temporary ID Management Function) deletes the temporary subscriber ID (i.e. the IMS identity and/or IMS profile) in the telecommunications network 100 (visited network) via "Delete Subscriber". Notification of the Repository User Function 151 may apply as in the seventh processing step 367 depending on the Provisioning flows of the telecommunications network 100. In roaming cases, the problem exists that the local subscriber 20 is normally not a registered IMS subscriber (but CS-attached), especially in cases where a non IMS subscriber is handled by an IMS system (having an IMS-oriented handling of telecommunications services). In this case the user equipment 20 or subscriber 20 needs a temporary user ID and profile (i.e. an IMS identity and/or an IMS profile) within the used IMS system of the telecommunications network 100.

Figure 6:
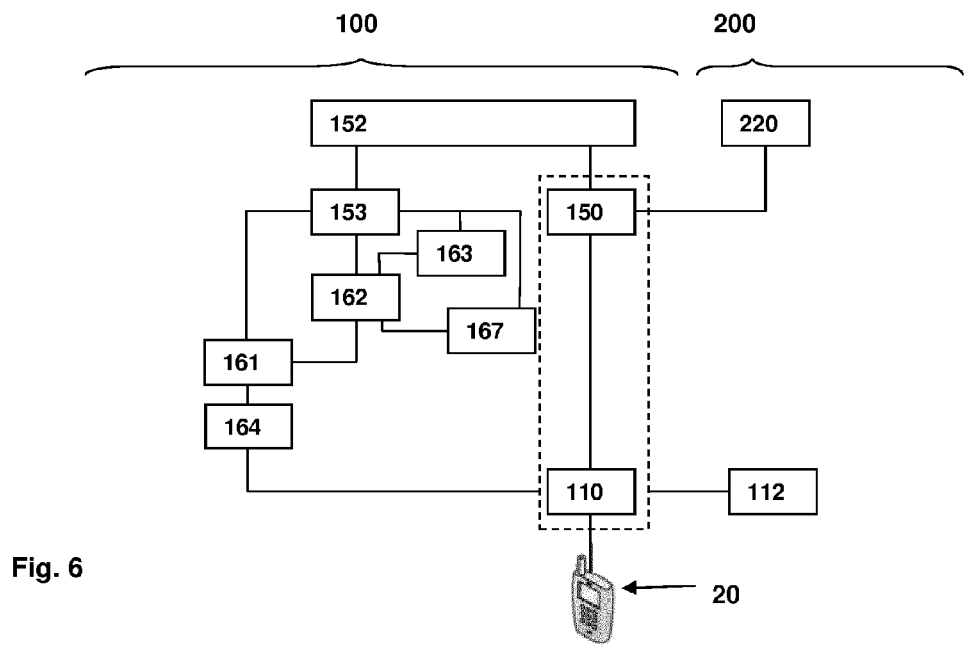
FIGS. 6 and 7 schematically illustrate—by means of a block diagram of the telecommunications network (FIG. 6) and by means of a communication diagram (FIG. 7)—a first exemplary embodiment showing a core centric approach.
Figure 7:
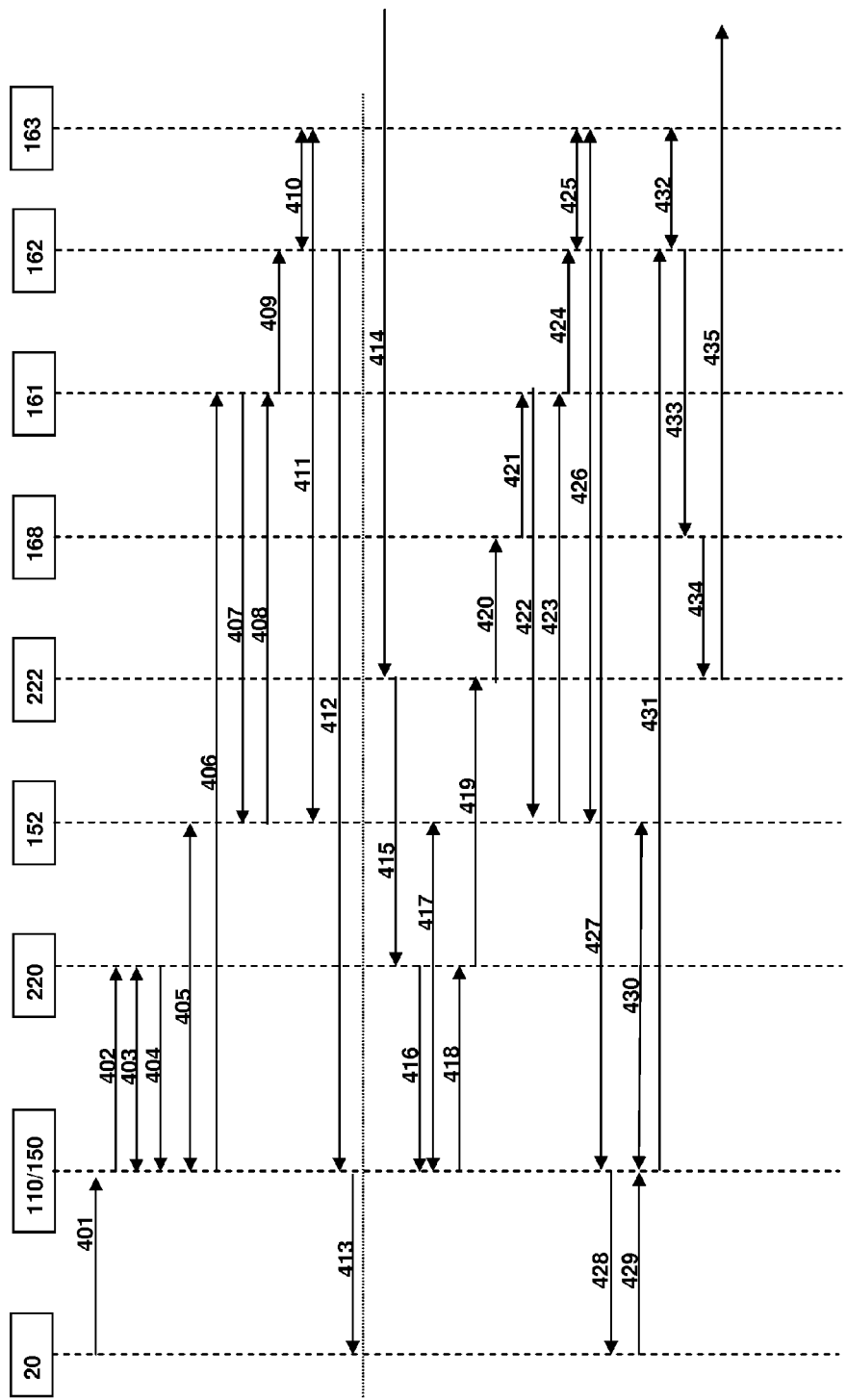

FIGS. 6 and 7 schematically illustrate—by means of a block diagram of the telecommunications network and by means of a communication diagram—a first implementation of the inventive method showing a core centric approach.

In FIG. 6, a part of the telecommunications network 100 according to the present invention and a part of the further telecommunications network 200 is schematically shown as a block diagram of the core centric implementation of the present invention. The telecommunications network 100 comprises the visited network subscriber repository 152, a frontend 153 of the visited network subscriber repository 152, an I-CSCF 161 (Interrogating Call Session Control Function), a S-CSCF 162 (Serving Call Session Control Function), a MMTel 163 (Multimedia Telephony Server), a P-CSCF 164 (Proxy Call Session Control Function), an IPSM 167 (IP (Internet Protocol) Short Message server), the identity management functionality 150, and the G-MSC server (Gateway MSC server) 112. The further telecommunications network 200 comprises the HLR 220. The identity management functionality 150 and the V-MSC server 110 are functionally linked in the core centric approach.

In FIG. 7, a communication diagram of the core centric implementation of the present invention is schematically shown. In a first processing step 401, the user equipment 20 or subscriber 20 sends a Location Updating Request message to the V-MSC server 110/identity management functionality 150. In a second processing step 402, the V-MSC server 110/identity management functionality 150 sends a Update Location Request message to the HLR 220. In a third processing step 403, an insert subscriber data procedure is executed and information exchanged between the HLR 220 and the V-MSC server 110/identity management functionality 150. In a fourth processing step 404, the HLR 220 sends an Update Location Acknowledge message to the V-MSC server 110/identity management functionality 150. In a fifth processing step 405, a Create subscriber process is executed and related information exchanged between the visited network subscriber repository 152 and the V-MSC server 110/identity management functionality 150. In a sixth processing step 406, the V-MSC server 110/identity management functionality 150 sends a Register message to the I-CSCF 161. In a seventh processing step 407, the I-CSCF 161 sends a Cx Query message to the visited network subscriber repository 152. In an eighth processing step 408, the visited network subscriber repository 152 sends a Cx Query Response message to the I-CSCF 161. In a ninth processing step 409, the I-CSCF 161 sends a Register message to the S-CSCF 162. In a tenth processing step 410, an ISC exchange is performed between the S-CSCF 162 and the MMTel 163. In an eleventh processing step 411, an Sh Pull process is executed between the MMTel 163 and the visited network subscriber repository 152. In a twelfth processing step 412, the S-CSCF 162 sends a 200 ok message to the V-MSC server 110/identity management functionality 150. In a thirteenth processing step 413, the V-MSC server 110/identity management functionality 150 sends a Location Updating Accept message to the user equipment 20 or subscriber 20. In a fourteenth processing step 414, the H-GMSC server 222 receives a IAM message (Initial Access Message) from another network node of the telecommunications network 100. In a fifteenth processing step 415, the H-GMSC server 222 sends a SRI message (Send Routing Information) to the HLR 220. In a sixteenth processing step 416, the HLR 220 sends a PRN message (Provide Roaming Number) to the V-MSC server 110/identity management functionality 150. In a seventeenth processing step 417, a Modify Subscriber Add Alias procedure is performed by exchange of data between the visited network subscriber repository 152 and the V-MSC server 110/identity management functionality 150. In a eighteenth processing step 418, the V-MSC server 110/identity management functionality 150 sends a PRN message to the HLR 220. In a nineteenth processing step 419, the HLR 220 sends a SRI message to the H-GMSC server 222. In a twentieth processing step 420, the H-GMSC server 222 sends a IAM message to the MGCF 168. In a twenty-first processing step 421, the MGCF 168 sends an Invite message to the I-CSCF 161. In a twenty-second processing step 422, the I-CSCF 161 sends a Cx Location Query message to the visited network subscriber repository 152. In a twenty-third processing step 423, the visited network subscriber repository 152 sends a Cx Location Query Response message to the I-CSCF 161. In a twenty-fourth processing step 424, the I-CSCF 161 sends an Invite message to the S-CSCF 162. In a twenty-fifth processing step 425, an ICS process is executed by data exchange between the S-CSCF 162 and the MMTel 163. In a twenty-sixth processing step 426, an Sh Pull exchange is executed between the MMTel 163 and the visited network subscriber repository 152. In a twenty-seventh processing step 427, the S-CSCF 162 sends an Invite message to the V-MSC server 110/identity management functionality 150. In a twenty-eighth processing step 428, the V-MSC server 110/identity management functionality 150 sends a Setup message to the user equipment 20 or subscriber 20. In a twenty-ninth processing step 429, the user equipment 20 or subscriber 20 sends a Call Confirmed message to the V-MSC server 110/identity management functionality 150. In a thirtieth processing step 430, a Modify Subscriber Delete Alias process is executed between the V-MSC server 110/identity management functionality 150 and the visited network subscriber repository 152. In a thirty-first processing step 431, the V-MSC server 110/ identity management functionality 150 sends a 200 ok message to the S-CSCF 162. In a thirty-second processing step 432, an ICS process is executed by data exchange between the S-CSCF 162 and MMTel 163. In a thirty-third processing step 433, the S-CSCF 162 sends a 200 ok message to the MGCF 168. In a thirty-fourth processing step 434, the MGCF 168 sends an ANM message to the H-GMSC server 222. In a thirty-fifth processing step 435, the H-GMSC server 222 sends an ANM message to the other network node of the telecommunications network 100.

Figure 8:
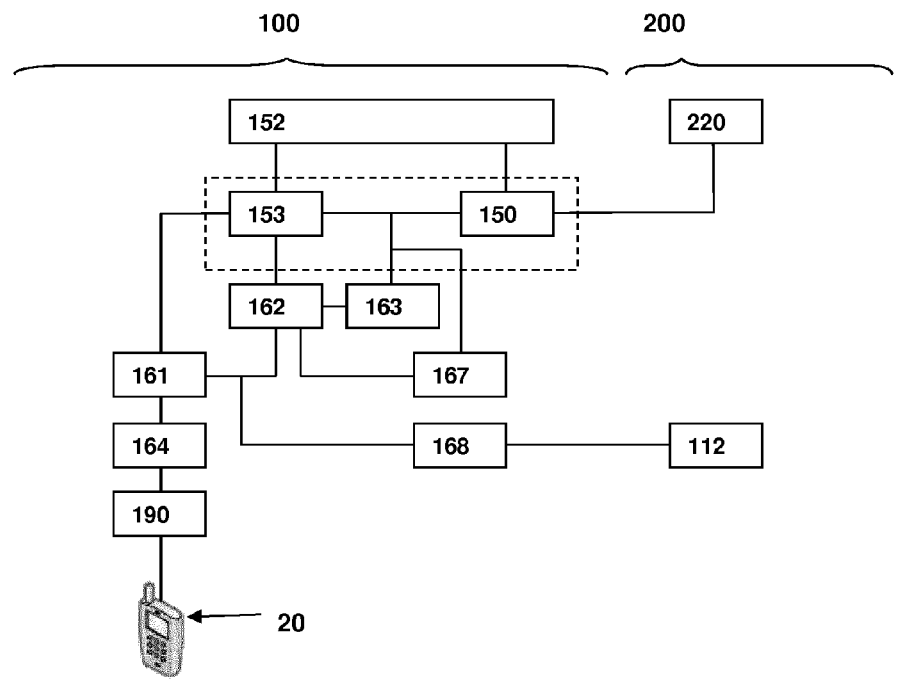
FIGS. 8 and 9 schematically illustrate—by means of a block diagram of the telecommunications network (FIG. 8) and by means of a communication diagram (FIG. 9)—a second exemplary embodiment showing an IMS centric approach.
Figure 9:
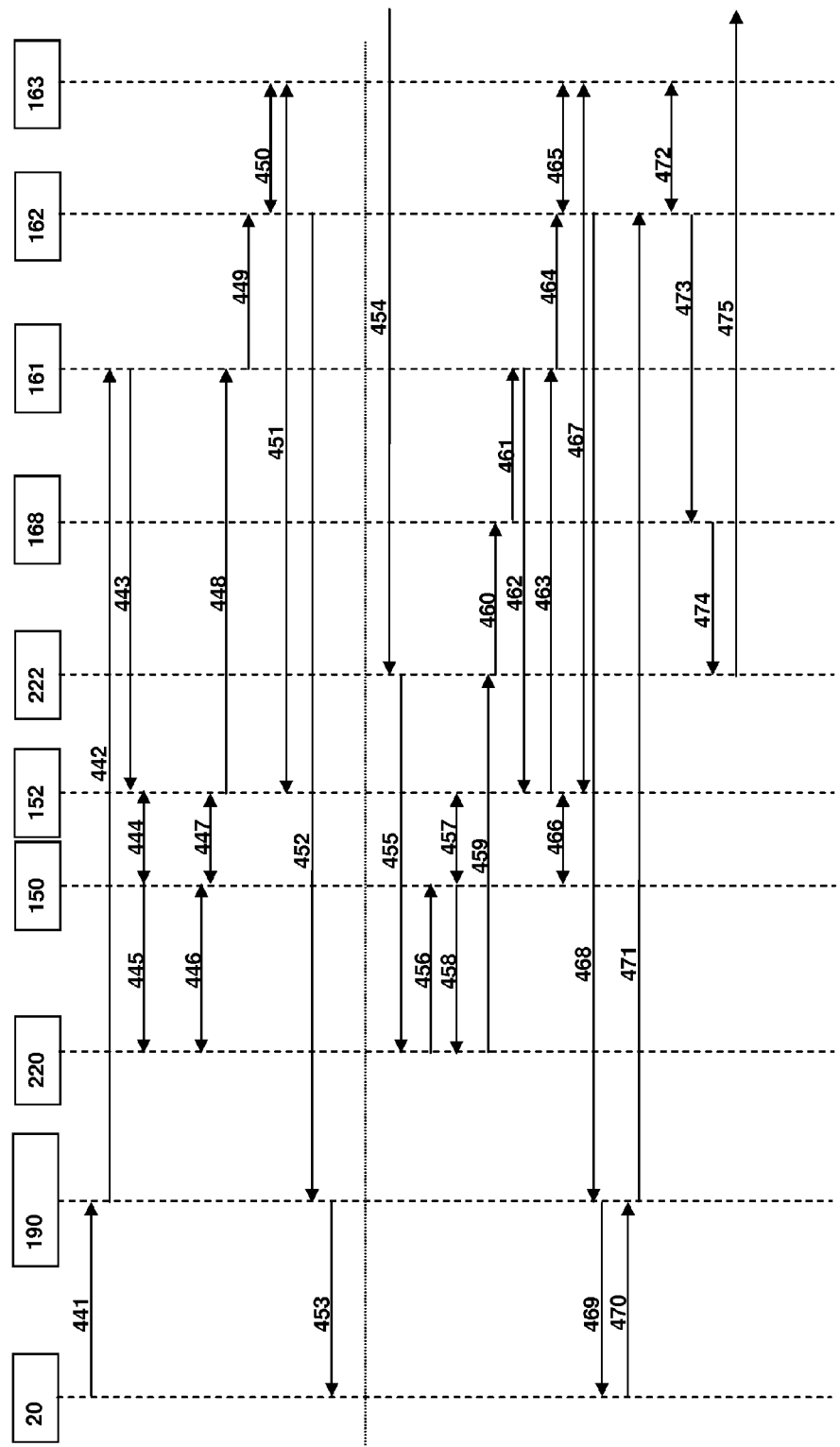

FIGS. 8 and 9 schematically illustrate—by means of a block diagram of the telecommunications network and by means of a communication diagram—a second implementation of the inventive method showing an IMS centric approach.

In FIG. 8, a part of the telecommunications network 100 according to the present invention and a part of the further telecommunications network 200 is schematically shown as a block diagram of the IMS centric implementation of the present invention. The telecommunications network 100 comprises the visited network subscriber repository 152, a frontend 153 of the visited network subscriber repository 152, an I-CSCF 161 (Interrogating Call Session Control Function), a S-CSCF 162 (Serving Call Session Control Function), a MMTel 163 (Multimedia Telephony Server), a P-CSCF 164 (Proxy Call Session Control Function), an IPSM 167 (IP (Internet Protocol) Short Message server), a MGCF 168 (Media Gateway Control Function), a CS Gateway node 190, the identity management functionality 150, and the G-MSC server (Gateway MSC server) 112. The further telecommunications network 200 comprises the HLR 220. The identity management functionality 150 and the frontend 153 of the visited network subscriber repository visited network subscriber repository 152 are functionally linked in the IMS centric approach.

In FIG. 9, a communication diagram of the IMS centric implementation of the present invention is schematically shown. In a first processing step 441, the user equipment 20 or subscriber 20 sends a Location Updating Request message to the CS Gateway node 190. In a second processing step 442, the CS Gateway node 190 sends a Register message to the I-CSCF 161. In a third processing step 443, the I-CSCF 161 sends a Cx Query message to the visited network subscriber repository 152. In a fourth processing step 444, the visited network subscriber repository 152 triggers the identity management functionality 150. In a fifth processing step 445, the identity management functionality 150 sends an Update Location Request message to the HLR 220. In a sixth processing step 446, the an Insert Subscriber Data process is executed and data exchanged between the HLR 220 and the identity management functionality 150. In a seventh processing step 447, a Create Subscriber process is executed and data exchanged between the identity management functionality 150 and the visited network subscriber repository 152. In an eighth processing step 448, the visited network subscriber repository 152 sends a Cx Query Response message to the I-CSCF 161. In a ninth processing step 449, the I-CSCF 161 sends a Register message to the S-CSCF 162. In a tenth processing step 450, an ISC exchange is performed between the S-CSCF 162 and the MMTel 163. In an eleventh processing step 451, an Sh Pull exchange is performed between the MMTel 163 and the visited network subscriber repository 152. In a twelfth processing step 452, the S-CSCF 162 sends a message to the CS Gateway node 190. In a thirteenth processing step 453, the CS Gateway node 190 sends a Location Updating Accept message to the user equipment 20 or subscriber 20. In a fourteenth processing step 454, the H-GMSC server 222 receives a IAM message (Initial Access Message) from another network node of the telecommunications network 100. In a fifteenth processing step 455, the H-GMSC server 222 sends a SRI message (Send Routing Information) to the HLR 220. In a sixteenth processing step 456, the HLR 220 sends a PRN message (Provide Roaming Number) to the identity management functionality 150. In a seventeenth processing step 457, a Modify Subscriber procedure is performed by exchange of data between the identity management functionality 150 and the visited network subscriber repository 152. In an eighteenth processing step 458, the identity management functionality 150 sends a PRN message to the HLR 220. In a nineteenth processing step 459, the HLR 220 sends a SRI message to the H-GMSC server 222. In a twentieth processing step 460, the H-GMSC server 222 sends an IAM message to the MGCF 168. In a twenty-first processing step 461, the MGCF 168 sends an Invite message to the I-CSCF 161. In a twenty-second processing step 462, the I-CSCF 161 sends a Cx Location Query message to the visited network subscriber repository 152. In a twenty-third processing step 463, the visited network subscriber repository 152 sends a Cx Location-Query Response message to the I-CSCF 161. In a twenty-fourth processing step 464, the I-CSCF 161 sends an Invite message to the S-CSCF 162. In a twenty-fifth processing step 465, an ISC exchange is performed between the S-CSCF 162 and the MMTel 163. In a twenty-sixth processing step 466, a Modify Subscriber process is executed between the identity management functionality 150 and the visited network subscriber repository 152. In a twenty-seventh processing step 467, the visited network subscriber repository 152 sends an Sh Pull message to the MMTel 163. In a twenty-eighth processing step 468, the S-CSCF 162 sends an Invite message to the CS Gateway node 190. In a twenty-ninth processing step 469, the CS Gateway node 190 sends a Setup message to the user equipment 20 or subscriber 20. In a thirtieth processing step 470, the user equipment 20 or subscriber 20 sends a message to the CS Gateway node 190. In a thirty-first processing step 471, the CS Gateway node 190 sends a message to the S-CSCF 162. In a thirty-second processing step 472, an ISC exchange is performed between the S-CSCF 162 and the MMTel 163. In a thirty-third processing step 473, the S-CSCF 162 sends a 200 Ok message to the MGCF 168. In a thirty-fourth processing step 474, the MGCF 168 sends an ANM message to the H-GMSC server 222. In a thirty-fifth processing step 475, the H-GMSC server 222 sends an ANM message to the other network node of the telecommunications network 100.

Figure 10:
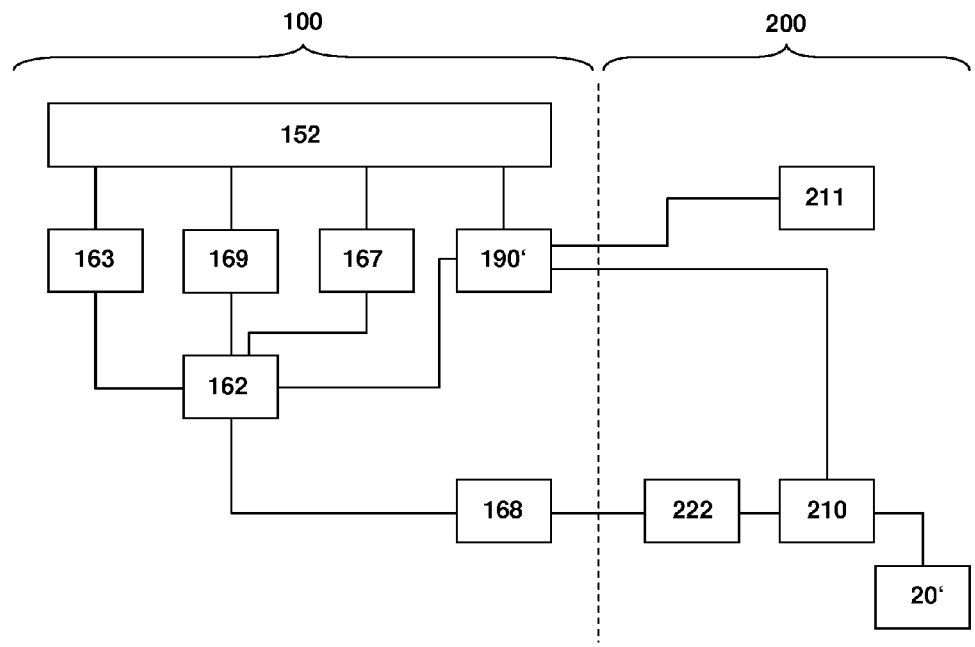
FIG. 10 schematically illustrates—by means of a block diagram of the telecommunications network—a telecommunications network according to the present invention, wherein a further subscriber is attached to a further telecommunications network.

In FIG. 10, a telecommunications network 100 according to the present invention is schematically illustrated by means of a block diagram of the telecommunications network 100. Here, the telecommunications network 100 is, with respect to a further subscriber 20', a home network 100. The telecommunications network 100 comprises an interconnection gateway node 190' (which is herein also called interconnection gateway 190') being configured to extend the use of an IMS (IP Multimedia Subsystem)-oriented handling of telecommunications services of the telecommunications network 100 to the further subscriber (20') in case the further subscriber 20' is attached to a further telecommunications network 200. According to the embodiment shown in FIG. 10, the further telecommunications network 200 is, with respect to the further subscriber (20'), a visited telecommunications network 200, wherein the further telecommunications network 200 is, in particular, a CS telecommunications network 200. According to the present invention, it is thereby advantageously possible, due to the implementation of the interconnection gateway 190', to provide identity management and/or routing and/or interconnection functionality, by the telecommunications network 100, for an outbound roamer 20' (i.e. the further subscriber 20') in a legacy CS network (i.e. the further telecommunications network 200). In this embodiment, the interconnection gateway 190' may also be called roaming gateway (R-GW). Thereby, it is advantageously possible, in particular, that the IMS of the home telecommunications network 100 and the respective applications become transparent with regard to the technology used in the roaming network 200. According to an alternative embodiment of the present invention, the further telecommunications network 200 may also be an CS-access network of the telecommunications network 100 (not shown). In FIG. 10, a part of the telecommunications network 100 according to the present invention and a part of the further telecommunications network 200 is schematically shown as a block diagram. The telecommunications network 100 comprises a network subscriber repository 152, a MMTel 163, a HSS-FE 169 (Home Subscriber Server Front-End), an IPSM 167, a S-CSCF 162, a MGCF 168 and the interconnection gateway 190'. Here, the interconnection gateway 190' may also be called a roaming gateway 190'. It is preferred according to the present invention, that the CS gateway 190 according to the present invention implements the functionality of the interconnection gateway 190'. The further telecommunications network 200 comprises a further GMSC 222—which is a visited GMSC with respect to the further subscriber 20' and therefore also called V-GMSC—, a further MSC 210—which is a visited MSC with respect to the further subscriber 20' and therefore also called further V-MSC or MSC/VLR—, and a further SMSC 211 (Short Message Service Center).

Figure 11:
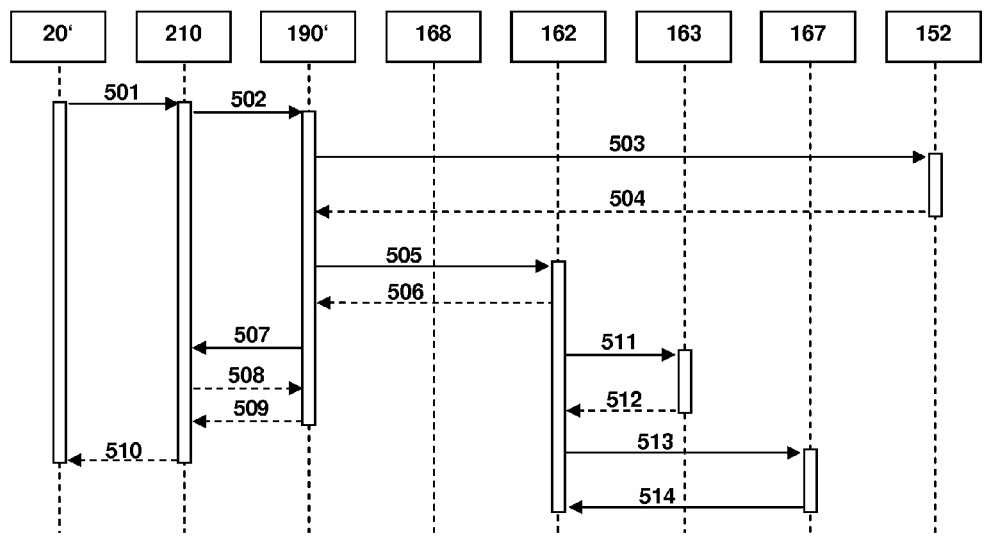
FIGS. 11-20 schematically illustrate—by means of a communication diagram—an extension of the use of an IMS (IP Multimedia Subsystem)-oriented handling of telecommunications services of the telecommunications network, according to the present invention, to a further subscriber, wherein the further subscriber is attached to a further telecommunications network.

In FIG. 11, an embodiment of the telecommunications network 100 according to the present invention is illustrated, wherein the interconnection gateway node 190' is configured for handling, on behalf of the further subscriber 20', IMS registration with the IMS of the telecommunications network 100, in case the interconnection gateway node 190' receives, from the further telecommunications network 200, location update request information related to the further subscriber 20'.

In a further first processing step 501, the further subscriber 20'—which is here, in particular, interchangeably also called roaming subscriber or roaming subscriber's device—initiates an location update in the further telecommunications network 200, which is, preferably a CS based visited public land mobile network (VPLMN) 200. In a further second processing step 502, the MSC/VLR 210 of the further telecommunications network 200 issues a Location Update Request towards the interconnection gateway 190' (i.e. transmits the location update request information to the interconnection gateway 190') of the telecommunications network 100, wherein the interconnection gateway 190' preferably acts as an HLR—which, in particular, means that the interconnection gateway 190' is configured to provide the functionality of a HLR. Preferably, the telecommunications network 100 is here a home public land mobile network (HPLMN) with respect to the further subscriber 20'. In a further third processing step (see reference numerals 503 and 504), the interconnection gateway 190' retrieves a subscriber profile of the further subscriber 20' from the (home) subscriber repository 152 within the (home) telecommunications network 100. In a further fourth processing step (see reference numerals 505, 506), the interconnection gateway 190', issues a Register—especially a Register for telephony services—on behalf of the roaming subscriber 20' towards the S-CSCF 162. In a further fifth processing step (see reference numerals 507, 508), the MSC/VLR 210 is loaded with the subscriber profile via ISD, if the Registration has completed successfully. In a further sixth processing step 509, the interconnection gateway 190' completes the location update towards the visited MSC/VLR 210 (cf. reference numeral 510). In a further seventh processing step (see reference numerals 511-514), the S-CSCF 162 triggers the application servers with 3PR as designed for the Internet Protocol (IP) telephony service, thus the roaming subscriber 20' is known to be reachable for telephony substantially in the same manner as in a non-roaming case.

Figure 12:
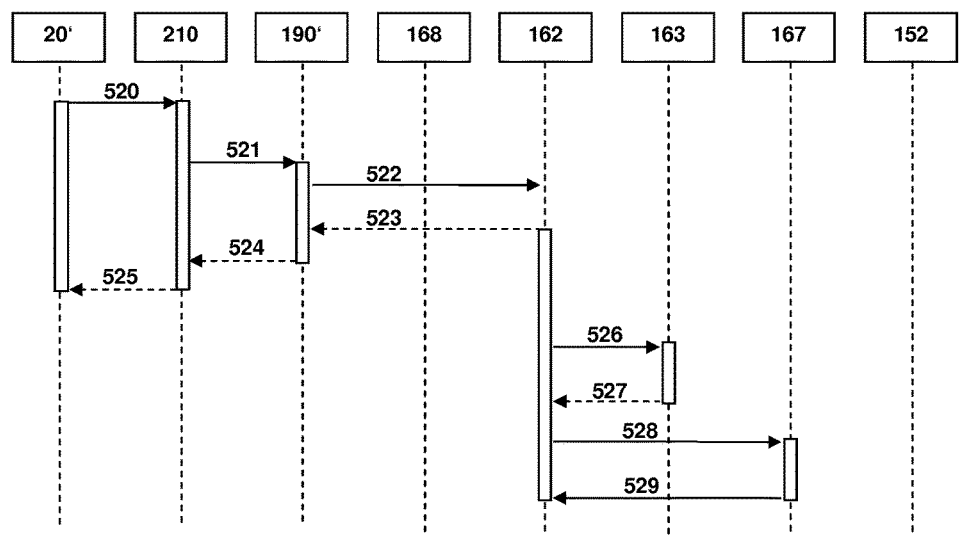

In FIG. 12, an embodiment of the telecommunications network 100 according to the present invention is illustrated, wherein the interconnection gateway node 190' is configured for handling, on behalf of the further subscriber 20', IMS de-registration with the IMS of the telecommunications network 100, in case the interconnection gateway node 190' receives, from the further telecommunications network 200, a detach request related to the further subscriber 20'.

In a further eighth processing step 520, the roaming subscriber's device 20 detaches from the (visited) further telecommunications network 200, wherein a detach request (i.e. a detach request message) is sent to the MSC/VLR 210. In a further ninth processing step 521, the MSC/VLR 210 sends a detach request message to the (HPLMN) interconnection gateway 190'. In a further tenth processing step 522, the interconnection gateway 190' sends De-Register (i.e. a De-Register message) to the S-CSCF 162. Subsequently, in particular, the corresponding response messages are transmitted to the further subscriber 20' (see reference numerals 523-525). In a further eleventh processing step (see reference numerals 526-529), the S-CSCF 162 deregisters the subscriber in all relevant services, as shown in FIG. 12.

Figure 13:
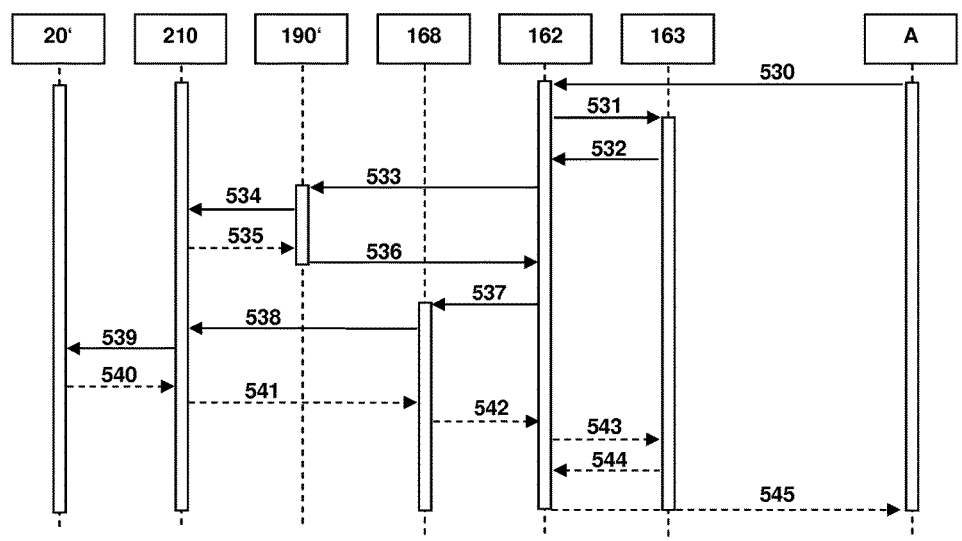

In FIG. 13, an embodiment of the telecommunications network 100 according to the present invention is illustrated, wherein the interconnection gateway node 190' is configured for routing a mobile terminated call, designated for the further subscriber 20', from the IMS of the telecommunications network 100 to the further telecommunications network 200.

In a further twelfth processing step 530, an incoming call is received in the S-CSCF 162 for the roaming subscriber 20' from a calling party (or A-party) A. In a further thirteenth processing step (see reference numerals 531), the S-CSCF 162 invokes the terminated telephony registered service by triggering the MMTEL 163. In a further fourteenth processing step, the MMTEL 163 continues call processing of terminated call towards the further subscriber 20' (cf. reference numerals 532, 533), wherein the telecommunications network 100 (and in particular the IMS service) is configured such that the interconnection gateway 190' is triggered as an application server for call routing.

In a further fifteenth processing step 534, the interconnection gateway 190' invokes a PRI request towards the MSC/VLR 210 in the visited further telecommunications network (200). In a further sixteenth processing step 535, the MSC/VLR 210 returns the roaming number to the interconnection gateway 190'. In a further eighteenth processing step (see reference numerals 536-545), the interconnection gateway 190' re-routes the call to the (visited) further telecommunications network 200 by using the roaming number received from the (visited) further telecommunications network 200. Preferably, in a first substep 536, an invite message is sent from the interconnection gateway 190' to the S-CSCF 162, wherein, in a second substep 537, an invite message 538 is sent to the MGCF 168, wherein, in a third substep 538, an IAM message is sent to the MSC/VLR 210, wherein, in a fourth substep 539, a setup message is sent to the further subscriber 20', wherein, in a fifth substep 540, an Alert is returned to the MSC/VLR 210, wherein, in a sixth substep 541, an ACM message is sent to the MGCF 168, wherein, subsequently (cf. reference numerals 542-545), Ringing messages are sent via S-CSCF 162 and MMTEL 163 to the A-party A.

Figure 14:
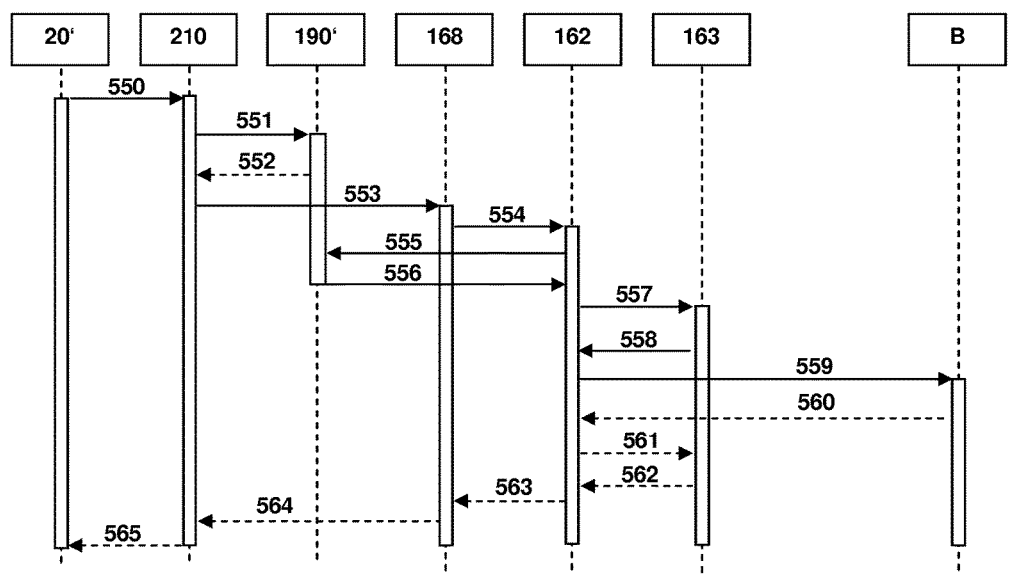

In FIG. 14, an embodiment of the telecommunications network 100 according to the present invention is illustrated, wherein the interconnection gateway node 190' is configured for routing a mobile originated call, initiated by the further subscriber 20', from the further telecommunications network 200 to the IMS of the telecommunications network 100.

In a further nineteenth processing step 550, the subscriber's device 20' initiates a mobile originated call. In a further twentieth processing step 551, the MSC/VLR 210 determines that a CAMEL handling is required for the call, wherein an Initial DP (Detection Point) is sent to the interconnection gateway 190' (minimum CAMEL phase 1). In a further twenty first processing step 552, the interconnection gateway 190' assigns a temporary number for the call and sends a Connect (reply) message to the MSC/VLR 210. In a further twenty second processing step, the MSC/VLR 210 continues call processing with the new destination number, wherein the call routing commences towards the interconnection gateway 190', wherein the interconnection gateway 190' receives the call and inserts the original call addressing data (cf. reference numerals 553-556). In a further twenty third processing step 557, an Invite message is sent to the S-CSCF 162 with the original call data. The standard call processing continues in the MMTEL (cf. reference numerals 558-565).

Figure 15:
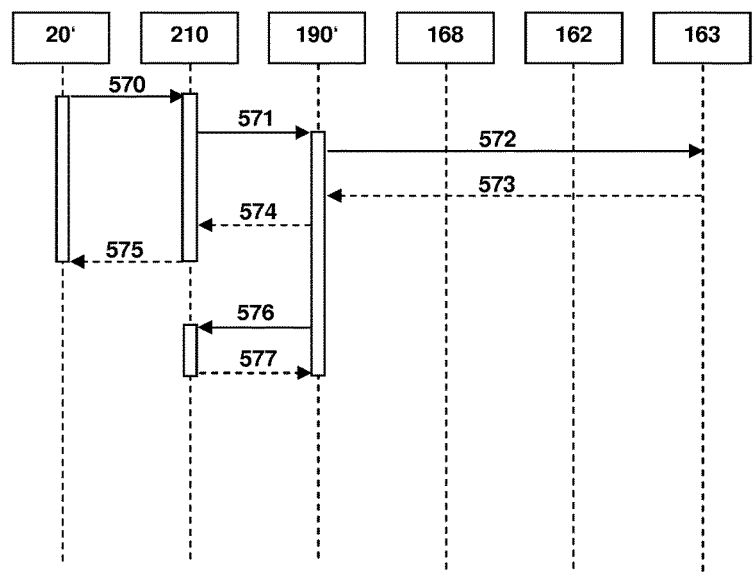

In FIG. 15, an embodiment of the telecommunications network 100 according to the present invention is illustrated, wherein the interconnection gateway node 190' is configured for forwarding, to the further telecommunications network 200, subscriber update data related to the further subscriber 20', in case the interconnection gateway node 190' receives, from the further telecommunications network 200, a SCI Request related to the further subscriber 20'.

In a further twenty fourth processing step 570, the subscriber attempts to modify or query supplementary service setting (e.g. "forwarded to number" settings), wherein the subscriber's device 20' sends a SCI Request to the MSC/VLR 210, e.g. Register SS. In a further twenty fifth processing step 571, the MSC/VLR 210 sends the SCI Request to the interconnection gateway 190'. In a further twenty sixth processing step (cf. reference numerals 572-573), the interconnection gateway 190' sends (and/or translates) an input request to the corresponding Ut interface towards the MMTEL 163. Alternatively the R-GW reads/modifies data in the subscriber repository 152 directly, wherein the MMTEL 163 is notified via push procedures agreed between the subscriber repository 152 and the MMTEL 163, e.g. Sh push via HSS. SCI response messages are illustrated by reference numerals 574 and 575. In a further twenty seventh processing step, if the further subscriber's 20' request did modify SS data and is relevant for the MSC/VLR 210, then the interconnection gateway 190' sends a stand alone ISD to update the subscriber data in the (visited) further telecommunications network 200 (cf. reference numerals 576-577).

Figure 16:
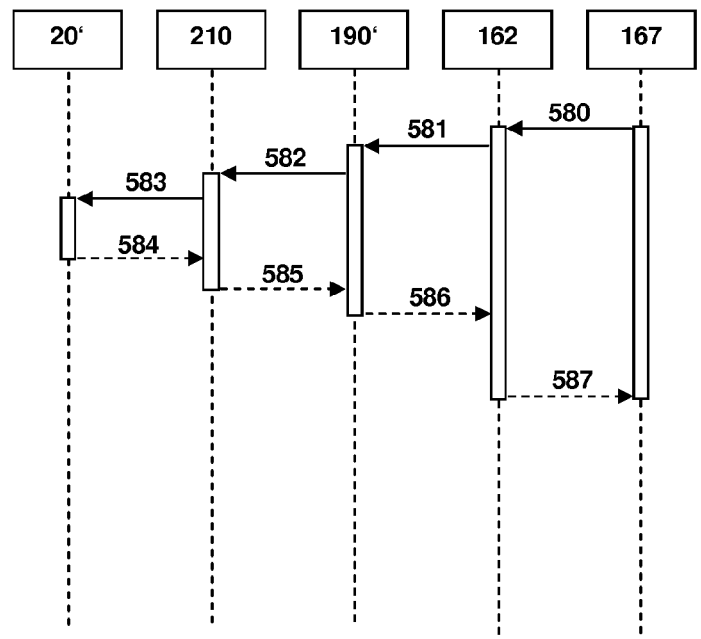

In FIG. 16, an embodiment of the telecommunications network 100 according to the present invention is illustrated, wherein the interconnection gateway node 190' is configured for forwarding, to the further telecommunications network 200, a Short Message (SM), designated for the further subscriber 20', in case the interconnection gateway node 190' receives, from the IMS of the telecommunications network 100, a message comprising the SM.

In a further twenty eighth processing step 580, the IP-SM 167 sends a Short Message (SM) encapsulated in a Message. In a further twenty ninth step 581, the S-CSCF 162 sends the Message to the interconnection gateway 190'. In a further thirtieth processing step 582, the interconnection gateway 190' unpacks (extracts or decapsulates) the Short Message and sends it to the MSC/VLR 210. In a further thirty first processing step 583, the MSC/VLR 210 delivers the Short Message to the subscriber's device 20'. Subsequently, further response/confirmation messages 584-587) are sent.

Figure 17:
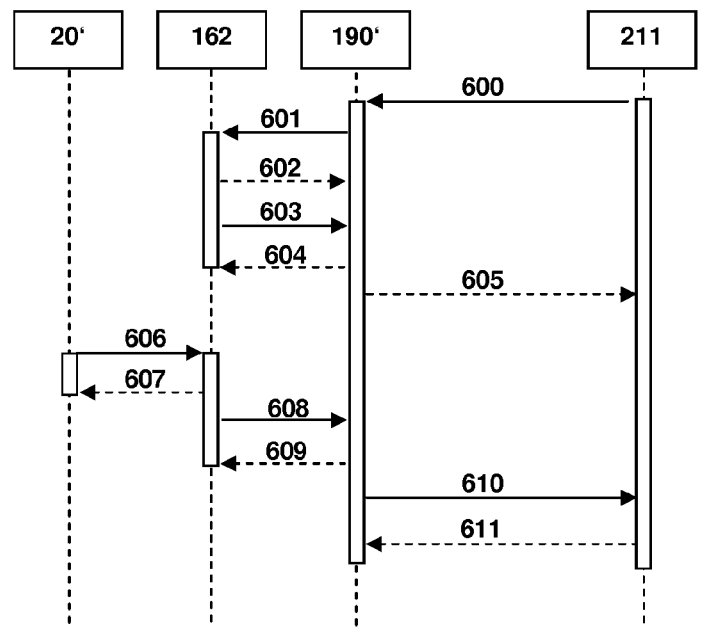

In FIG. 17, an embodiment of the telecommunications network 100 according to the present invention is illustrated, wherein the interconnection gateway node 190' is configured for notifying the further telecommunications network 200 about a status change related to the further subscriber 20', in case the interconnection gateway node 190' receives, from the further telecommunications network 200, Report SM Status Request information related to the user.

In a further thirty second processing step 600, if a delivery of a short message from an interconnected SMSC 211 failed (e.g. in case the further subscriber 20' is unreachable), then the SMSC 211 informs the interconnection gateway 190' about the failure via Report SM Status message (cf. reference numeral 600). In a further thirty third processing step, the interconnection gateway 190' subscribes to resources in the IMS network of the telecommunications network 100 which are configured to publish changes to the state of the further subscriber 20', e.g. the S-CSCF 162 or other application servers (cf. reference numerals 601, 602). In a further thirty fourth processing step 605, a Report SM Status is confirmed towards the SMSC 211. Subsequently, the SMSC 211 is waiting for alerting from the interconnection gateway 190'. Here, in particular, reference numeral 605 indicates a Report SM Status Response message. In a further thirty fifth processing step, the interconnection gateway 190' receives status updates as part of the subscriptions issued earlier. If the status change affects the reachability for short message delivery then the interconnection gateway 190' notifies the SMSC 211 via an Alert SC Request (cf. reference numerals 606-611), wherein preferably an register message is indicated by reference numeral 606. Subsequently, the SMSC 211 retries to deliver the short message according to the embodiment shown in FIG. 16 (mobile terminated short message).

Figure 18:
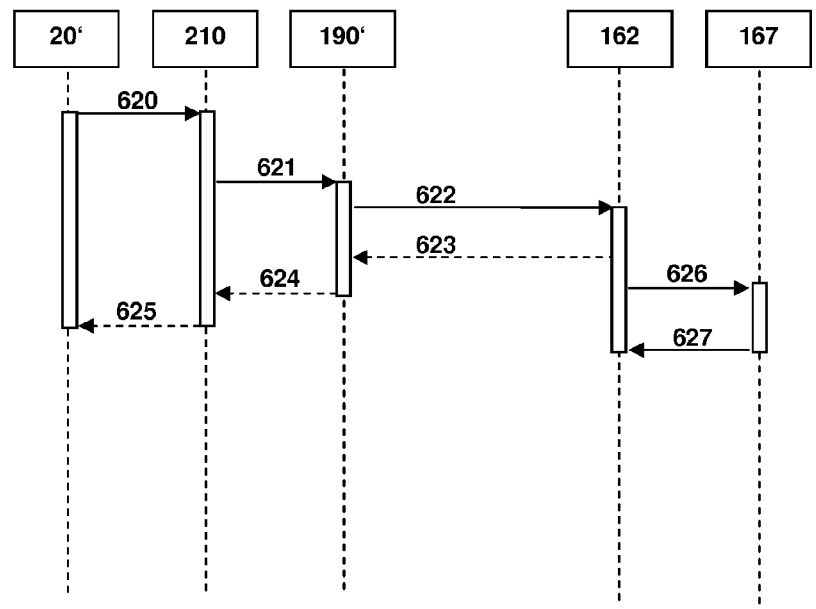

In FIG. 18, an embodiment of the telecommunications network 100 according to the present invention is illustrated, wherein the interconnection gateway node 190' is configured for handling, on behalf of the further subscriber 20', another IMS registration with the IMS of the telecommunications network 100, in case the interconnection gateway node 190' receives, from the further telecommunications network 200, Ready For SM Request information related to the further subscriber 20'.

In a further thirty sixth processing step, if the delivery of a mobile terminated message failed (e.g. memory exceeded or further subscriber 20' unreachable), then the MSC/VLR 210 supervises the further subscriber 20' (i.e. the further subscriber's device 20') such that the further subscriber 20' becomes SM ready again, wherein, in case the further subscriber 20' becomes ready for SM again and the MSC/VLR 210 detects that the further subscriber 20' is ready for SM again, then a Ready For SM Request is sent to the interconnection gateway 190' (cf. reference numerals 620, 621). In a further thirty seventh processing step, the interconnection gateway 190' issues another Register towards the S-CSCF 162 (cf. reference numerals 622, 623). In a further thirty eighth processing step, the S-CSCF 162 triggers the IP-SM 167 with a 3rd party Register (cf. reference numerals 626). The IP-SM 167 sends a confirmation message 627 and the flow continues to the further subscriber 20' (cf. reference numerals 623-625). In a further thirty ninth processing step, the IP-SM 167 subsequently initiates another mobile terminated short message transfer according to the embodiment shown in FIG. 15 (subscriber controlled input for supplementary services).

Figure 19:
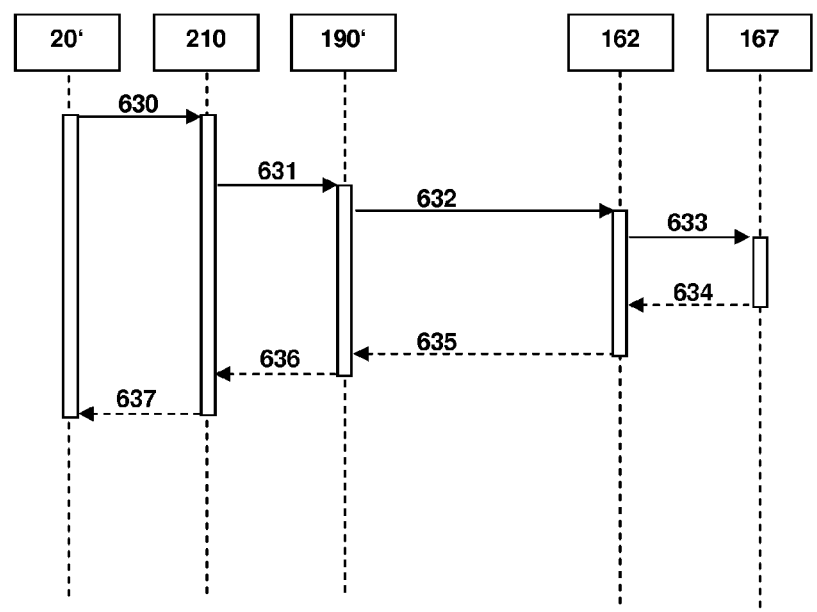

In FIG. 19, an embodiment of the telecommunications network 100 according to the present invention is illustrated, wherein the interconnection gateway node 190' is configured for forwarding, to the IMS of the telecommunications network 100, a further message comprising a further SM, designated to the further subscriber 20', in case the interconnection gateway node 190' receives, from the further telecommunications network 200, the further SM.

In a fortieth processing step 630, the further subscriber 20' (i.e. the further subscriber's device or user equipment) sends a short message (SM) to the MSC/VLR 210. In a forty first processing step 631, the MSC/VLR 210 sends the short message to the interconnection gateway 190', wherein the interconnection gateway is configured as the routing endpoint for Messages targeted to the telecommunications network 100, in particular to the home operator's service centre addresses. In a forty second processing step 632, the interconnection gateway 190' encapsulates the Short Message in a Message and sends it to the S-CSCF 162, wherein the S-CSCF 162 sends the message to the IP-SM 167 in a subsequent step (cf. reference numeral 633). Further messages are illustrated by reference numerals 634-637), wherein a SMS MO (mobile originated) response message 636 and a submit response message 637 are illustrated.

Figure 20:
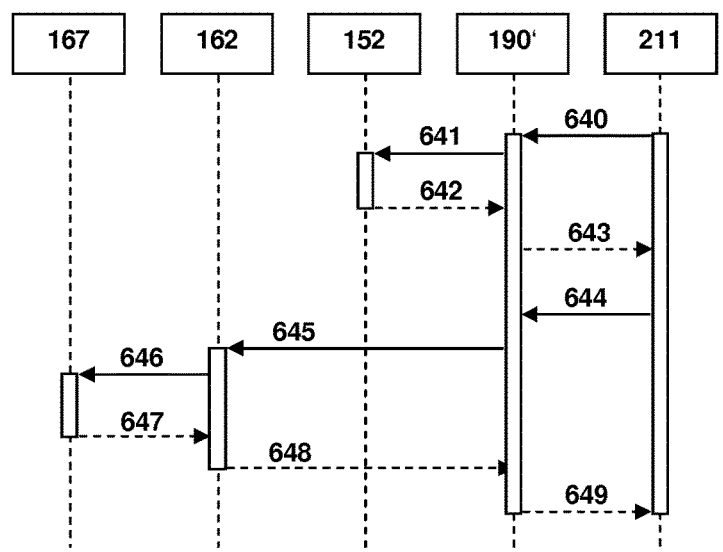

In FIG. 20, an embodiment of the telecommunications network 100 according to the present invention is illustrated, wherein the interconnection gateway node 190' is configured for transmitting, to a Short Message Service Centre (SMSC) of another telecommunications network, routing data in case the interconnection gateway node 190' receives, from the SMSC, a Send Routing Information (SRI) for SM Request related to the further subscriber 20', wherein the routing data comprises identification information for identification of the interconnection gateway node 190', wherein the interconnection gateway node 190' is configured for transmitting, to the IMS of the telecommunications network 100, another message comprising another SM in case the interconnection gateway node 190' receives, from the SMSC, a SM related to the further subscriber 20'.

In a forty third processing step 640, a foreign SMSC 211 queries, at the interconnection gateway 190', routing information for a delivery of a SM. In a forty fourth processing step, the interconnection gateway 190', processes the request for routing information, wherein SMS subscription data are retrieved from the subscriber repository 152 in order to check a subscription of the further subscriber 20' (cf. reference numerals 641,642). In a forty fifth processing step, in case that the request for routing information has been authorized, the routing data are transmitted to the foreign SMSC 211 (cf. message 643), wherein the routing data comprise an address or reference (pointer) to the interconnection gateway 190'. In a forty sixth processing step, the interconnection gateway 190' encapsulates the received Short Message in a Message and forwards it to the S-CSCF 162 (cf. reference numerals 644-645). In a forty seventh processing step 646, the S-CSCF 162 forwards the Message to the IP-SM 167, wherein Mobile Terminated SM delivery is applied by the IP-SM 167 (cf. reference numerals 647-649).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for extending IP Multimedia Subsystem (IMS) handling of telecommunications services within a telecommunications network for a subscriber using circuit switched (CS) connectivity, wherein an identification information of the subscriber is natively lacking an IMS identity and/or IMS profile within the telecommunications network, the method comprising:
    generating, at least temporarily, by an identity management functionality of the telecommunications network, the IMS identity and/or IMS profile with respect to the subscriber; and
    communicating, by an interconnection gateway node of the telecommunications network, with a further telecommunications network, wherein a further subscriber is attached to the further telecommunications network, wherein the interconnection gateway node is configured to extend the IMS handling of telecommunications services of the telecommunications network to the further subscriber in case that the telecommunications network, with respect to the further subscriber, is a home telecommunications network;
    wherein the further telecommunications network is, with respect to the further subscriber, a visited telecommunications network, wherein the further telecommunications network is configured to only provide the CS connectivity to the further subscriber, and wherein the method further comprises: notifying, by the interconnection gateway node, the further telecommunications network about a status change related to the further subscriber, in case the interconnection gateway node receives, from the further telecommunications network, Report SM Status Request information related to the further subscriber; and wherein the method further comprises:
    handling, by the interconnection, gateway node, on behalf of the further subscriber, IMS registration with the IMS of the telecommunications network, in case the interconnection gateway node receives, from the further telecommunications network, location update request information related to the further subscriber, and/or
    handling, by the interconnection gate node, on behalf of the further subscriber, IMS de-registration with the IMS of the telecommunications network, in case the interconnection gateway node receives, from the further telecommunications network, a detach request related to the further subscriber, and/or
    routing, by the interconnection gateway node, a mobile terminated call, designated for the further subscriber, from the IMS of the telecommunications network to the further telecommunications network, and/or
    routing, by the interconnection gateway node, a mobile originated call, initiated by the further subscriber, from the further telecommunications network to the IMS of the telecommunications network, and/or
    forwarding, by the interconnection gateway node, to the further telecommunications network, subscriber update data related to the further subscriber, in case the interconnection gateway node receives, from the further telecommunications network, a Subscriber Controlled Input (SCI) Request related to the further subscriber, and/or
    forwarding, by the interconnection gateway node, to the further telecommunications network, a Short Message, (SM), designated for the further subscriber, in case the interconnection gateway node receives, from the IMS of the telecommunications network, a message comprising the SM, and/or
    handling, by the interconnection gateway node, on behalf of the further subscriber, another IMS registration with the IMS of the telecommunications network, in case the interconnection gateway node receives, from the further telecommunications network, Ready For SM Request information related to the further subscriber, and/or
    forwarding, by the interconnection gateway node, to the IMS of the telecommunications network, a further message comprising a further SM, designated to the further subscriber, in ease the interconnection gateway node receives, from the further telecommunications network, the further SM, and/or
    transmitting, by the interconnection gateway node, to a Short Message Service Centre (SMSC) of another telecommunications network, routing data in case the interconnection gateway node receives, from the SMSC, a Send Routing Information (SRI) for SM Request related to the further subscriber, wherein the routing data comprises identification information for identification of the interconnection gateway node, wherein the interconnection gateway node is configured for transmitting, to the IMS of the telecommunications network, another message comprising another SM in case the interconnection gateway node receives, from the SMSC, a SM related to the further subscriber.

2. The method according to claim 1, wherein in case that the subscriber is a roaming subscriber within the telecommunications network such that the telecommunications network is the visited telecommunications network with respect to the subscriber and the subscriber is additionally associated with a further telecommunications network serving as a home telecommunications network for the subscriber, the method comprises the following steps for the subscriber to register with the visited telecommunications network of the subscriber:
  in a first step, the home telecommunications network of the subscriber is contacted by the visited telecommunications network of the subscriber to attempt to obtain the IMS identity and/or IMS profile of the subscriber; and
  in a second step, subsequent to the first step and after determining an absence of the IMS identity and/or IMS profile of the subscriber from the home telecommunications network of the subscriber, the IMS identity and/or IMS profile for the subscriber is generated by the visited telecommunications network of the subscriber and used with respect to the subscriber within the visited telecommunications network of the subscriber.

3. The method according to claim 2, wherein the IMS identity and/or IMS profile of the subscriber is generated using a home identity information of the subscriber in the home telecommunications network of the subscriber.

4. The method according to claim 2, wherein prior to generating the IMS identity and/or IMS profile, a location update procedure is performed in the home telecommunications network of the subscriber.

5. The method according to claim 1, wherein in case that the telecommunications network is the home telecommunications network of the subscriber, the method comprises the following for the subscriber to register with the telecommunications network:
  generating, by the telecommunications network, the IMS identity and/or IMS profile and using the IMS identity and/or IMS profile with respect to the subscriber within the telecommunications network.

6. The method according to claim 3, wherein the home identity information is International Mobile Subscriber Identification (IMSI); and
  wherein a set of subscriber related data is sent from the home telecommunications network of the subscriber to the visited telecommunications network of the subscriber such that the IMS identity and/or IMS profile of the subscriber is generated using the set of subscriber related data, wherein the subscriber related data includes identification, permission, registration and/or activation data.

7. A telecommunications network for extending IP Multimedia Subsystem (IMS) handling of telecommunications services within the telecommunications network for a subscriber using circuit switched (CS) connectivity in the telecommunications network, wherein an identification information of the subscriber is natively lacking an IMS identity and/or IMS profile within the telecommunications network, wherein the telecommunications network comprises:
  an identity management functionality, configured to generate, at least temporarily, the IMS identity and/or IMS profile with respect to the subscriber; and
  an interconnection gateway node for communication with a further telecommunications network, wherein a further subscriber is attached to the further telecommunications network, wherein the interconnection gateway node is configured to extend the IMS handling of telecommunications services of the telecommunications network to the further subscriber in case that the telecommunications network, with respect to the further subscriber, is a home telecommunications network;
  wherein the further telecommunications network is, with respect to the further subscriber, a visited telecommunications network, wherein the further telecommunications network is configured to only provide CS connectivity to the further subscriber, and wherein the interconnection gateway node is configured for: notifying, by the interconnection gateway node, the further telecommunications network about a status change related to the further subscriber, in case the interconnection gateway node receives, from the further telecommunications network, Report SM Status Request information related to the further subscriber; and
  wherein the interconnection gateway node is configured for:
    handling, on behalf of the further subscriber, IMS registration with the IMS of the telecommunications network, in case the interconnection gateway node receives, from the further telecommunications network, location update request information related to the further subscriber, and/or
    handling, on behalf of the further subscriber, IMS de-registration with the IMS of the telecommunications network, in case the interconnection gateway node receives, from the further telecommunications network, a detach request related to the further subscriber, and/or
    routing a mobile terminated call, designated for the further subsriber, from the IMS of the telecommunications network to the further telecommunications network, and/or
    routing a mobile originated call, initiated by the further subscriber, from the further telecommunications network to the IMS of the telecommunications network, and/or
    forwarding, to the further telecommunications network, subscriber update data related to the further subscriber, in case the interconnection gateway node receives, from the further telecommunications network, a Subscriber Controlled Input (SCI) Request related to the further subscriber, and/or
    forwarding, to the further telecommunications network, a Short Message (SM), designated for the further subscriber, in case the interconnection gateway node receives, from the IMS of the telecommunications network, a message comprising the SM, and/or
    handling, on behalf of the further subscriber, another IMS registration with the IMS of the telecommunications network, in case the interconnection gateway node receives, from the further telecommunications network, Ready For SM Request information related to the further subscriber, and/or
    forwarding, to the IMS of the telecommunications network, a further message comprising a further SM, designated to the further subscriber, in case the interconnection gateway node receives, from the further telecommunications network, the further SM, and/or
    transmitting, to a Short Message Service Centre (SMSC) of another telecommunication network, routing data in case the interconnection gateway node receives, from the SMSC, a Send Routing Information (SRI) for SM Request related to the further subscriber, wherein the routing data comprises identification information for identification of the interconnection gateway node, wherein the interconnection gateway node is configured for transmitting, to the IMS of the telecommunications network, another message comprising another SM in case the interconnection gateway node receives, from the SMSC, a SM related to the further subscriber.

8. The telecommunications network according to claim 7, wherein the telecommunications network is further configured such that:
in case that the subscriber is a roaming subscriber within the telecommunications network such that the telecommunications network, with respect to the subscriber, is a visited telecommunications network and the subscriber is additionally associated with the further telecommunications network serving as a home telecommunications network with respect to the subscriber, in order for the subscriber to register with the visited telecommunications network of the subscriber the home telecommunications network of the subscriber is contacted by the visited telecommunications network of the subscriber for the visited telecommunications network of the subscriber to attempt to obtain the IMS identity and/or IMS profile of the subscriber, and after determining an absence of the IMS identity and/or IMS profile of the subscriber from the home telecommunications network of the subscriber, an IMS identity and/or IMS profile is generated by the visited telecommunications network of the subscriber and used with respect to the subscriber within the visited telecommunications network of the subscriber.

9. The telecommunications network according to claim 8, wherein the IMS identity and/or IMS profile of the subscriber is generated using a home identity information of the subscriber in the home telecommunications network of the subscriber.

10. The telecommunications network according to claim 8, wherein the telecommunications network is configured such that:
prior to generating the IMS identity and/or IMS profile by the visited telecommunications network of the subscriber, a location update procedure is performed in the home telecommunications network of the subscriber, and a set of subscriber related data sent to the visited telecommunications network of the subscriber, the IMS identity and/or IMS profile of the subscriber being generated using the set of subscriber related data, wherein the set of subscriber related data comprises identification, permission, registration and activation data.

11. The telecommunications network according to claim 7, wherein the telecommunications network is configured such that:
in case that the telecommunications network is a home telecommunications network of the subscriber, in order for the subscriber to register with the telecommunications network, the IMS identity and/or IMS profile is generated by the telecommunications network and used with respect to the subscriber within the telecommunications network.

12. The telecommunications network according to claim 7, wherein the telecommunications network further comprises:
at least one CS gateway node, the at least one CS gateway node being configured to act as an interface towards the subscriber.

13. The telecommunications network according to claim 9, wherein the home identity information is International Mobile Subscriber Identification (IMSI).

14. The telecommunications network according to claim 12, wherein the at least one CS gateway node is configured to provide an Iu interface and/or an A interface, and to provide location management of the subscriber, lacking an SS7 interface towards other nodes of the telecommunications network; and
wherein the at least one CS gateway node comprises the interconnection gateway node for communication with the further telecommunications network.

15. One or more non-transitory, computer-readable mediums having processor-executable instructions stored thereon, the processor-executable instructions, when executed on one or more computers or network nodes, causes the one or more computers or network nodes to perform a method for extending IP Multimedia Subsystem (IMS) handling of telecommunications services within the telecommunications network for a subscriber using circuit switched (CS) connectivity, wherein an identification information of the subscriber is natively lacking an IMS identity and/or IMS profile within the telecommunications network, the method comprising:
generating, at least temporarily, by an identity management functionality of the telecommunications network, the IMS identity and/or IMS profile with respect to the subscriber; and
communicating, by an interconnection gateway node of the telecommunications network, with a further telecommunications network, wherein a further subscriber is attached to the further telecommunications network, wherein the interconnection gateway node is configured to extend the IMS handling of the telecommunications services of the telecommunications network to the further subscriber in case that the telecommunications network, with respect to the further subscriber, is a home telecommunications network;
wherein the further telecommunications network is, with respect to the further subscriber, a visited telecommunications network, wherein the further telecommunications network is configured to only provide CS connectivity to the further subscriber, and wherein the method further comprises: notifying, by the interconnection gateway node, the further telecommunications network about a status change related to the further subscriber, in case the interconnection gateway node receives, from the further telecommunications network, Report SM Status Request information related to the further subscriber; and
wherein the method further comprises:
handling, by the interconnection gateway node, on behalf of the further subscriber, IMS registration with the IMS of the telecommunications network, in case the interconnection gateway node receives, from the further telecommunications network, location update request information related to the further subscriber, and/or
handling, by the interconnection gateway node, on behalf of the furher subscriber, IMS de-registration with the IMS of the telecommunications network, in case the interconnection gateway node receives, from the further telecommunications network, a detach request related to the further subscriber, and/or
routing, by the interconnection gateway node, a mobile terminated call, designated for the further subscriber, from the IMS of the telecommunications network to the further telecommunications network, and/or routing, by the interconnection gateway node, a mobile originated call, initiated by the further subscriber, from the further telecommunications network to the IMS of the telecommunications network, and/or forwarding, by the interconnection gateway node, to the further telecommunications network, subscriber update data related to the further subscriber, in case the interconnection gateway node receives, from the further telecommunications network, a Subscriber Controlled Input (SCI) Request related to the further subscriber, and/or forwarding, by the interconnection gateway node, to the further telecommunications network, a Short Message (SM), designated for the further subscriber, in case the interconnection gateway node receives, from the IMS of the telecommunications network, message comprising the SM, and/or handling, by the interconnection gateway node, on behalf of the further subscriber, another IMS registration with the IMS of the telecommunications network, in case the it gateway node receives, from the further telecommunications network, Ready For SM Request information related to the further subscriber, and/or forwarding, by the interconnection gateway node, to the IMS of the telecommunications network, a further message comprising a further SM, designated to the further subscriber, in case the interconnection gateway node receives, from the further telecommunications network, the further SM, and/or transmitting, by the interconnection gateway node, to Short Message Service Centre (SMSC) of another telecommunications network, routing data in case the interconnection gateway node receives, from the SMSC, a Send Routing information (SRI) for SM Request related to the further subscriber, wherein the routing data comprises identification information for identification of the interconnection gateway node, wherein the interconnection gateway node is configured for transmitting, to the IMS of the telecommunications network, another message comprising another SM in case the interconnection gateway node receives, from the SMSC, a SM related to the further subscriber.

\* \* \* \* \*